US011810076B1

(12) United States Patent
Thairu et al.

(10) Patent No.: US 11,810,076 B1
(45) Date of Patent: *Nov. 7, 2023

(54) PAYMENT PROCESSING METHOD AND APPARATUS USING AN INTERMEDIARY PLATFORM

(71) Applicant: Stripe, Inc., San Francisco, CA (US)

(72) Inventors: Timothy Thairu, San Francisco, CA (US); Lachlan Groom, San Francisco, CA (US)

(73) Assignee: STRIPE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,251

(22) Filed: Jun. 3, 2022

Related U.S. Application Data

(63) Continuation of application No. 16/428,650, filed on May 31, 2019, now Pat. No. 11,361,284.

(60) Provisional application No. 62/678,880, filed on May 31, 2018.

(51) Int. Cl.
*G06Q 20/40* (2012.01)
*G06Q 20/02* (2012.01)

(52) U.S. Cl.
CPC ....... *G06Q 20/027* (2013.01); *G06Q 20/4097* (2013.01)

(58) Field of Classification Search
None
See application file for complete search history.

(56) References Cited

U.S. PATENT DOCUMENTS

| | | | | |
|---|---|---|---|---|
| 5,802,499 A | * | 9/1998 | Sampson | G06Q 40/02 705/35 |
| 8,820,633 B2 | * | 9/2014 | Bishop | G06Q 20/202 235/379 |
| 2004/0225550 A1 | * | 11/2004 | Helander | G06Q 10/10 705/7.14 |
| 2010/0205091 A1 | * | 8/2010 | Graziano | G06Q 30/02 705/40 |
| 2011/0258003 A1 | * | 10/2011 | Brown | G06Q 30/04 705/3 |
| 2015/0193748 A1 | * | 7/2015 | Pentel | G06Q 20/02 705/39 |
| 2016/0086167 A1 | * | 3/2016 | Shastry | G06Q 40/04 705/41 |

* cited by examiner

*Primary Examiner* — Bruce I Ebersman
*Assistant Examiner* — Matthew Cobb
(74) *Attorney, Agent, or Firm* — Womble Bond Dickinson (US) LLP

(57) ABSTRACT

A payment processing method and apparatus for using an intermediary platform are described. In one embodiment, the method comprises electronically receiving approval from an intermediary platform associated with a payment processor user of a first authorization request for a first transaction; electronically receiving for approval, at the payment processing system, a second authorization request for a second transaction from a merchant using a payment instrument used by an agent of the service provider; and settling transactions associated with the service provider, including clearing a batch of records corresponding to the service provider on a predetermined time basis by comparing, with a tracking engine of the payment processing system, transaction tracking information associated with authorization requests to net out individual transactions.

20 Claims, 16 Drawing Sheets curl Ruby Python PHP Java Node Go .NET

```
$   pay curl api /v1/issuing/cardholders \
>       -u sk_test_BQokikJOvBiT2HlwgH4olfQ2: \
>       -d name="Jenny Rosen" \
>       -d email="Jenny.rosen@example.com" \
>       -d phone_number="+18068675369" \
>       -d status=active \
>       -d type=individual \
>       -d billing[name]="Jenny Rosen" \
>       -d billing[line1]="1234 Main Street" \
>       -d billing[city]="San Francisco" \
>       -d billing[state]=CA \
>       -d billing[postal_code]=94111 \
>       -d billing[country]=US
```

FIG. 10

```
1   {
2       "id": "ich_1Cm3pZlyNTgCDVfzT83rasFP" ,
3       "object": "issuing_cardholder" ,
4       "billing": {
5           "address": {
6               "city": "San Francisco" ,
7               "country": "US" ,
8               "line1": "1234 Main Street" ,
9               "postal_code": "94111" ,
10              "state": "CA"
    ...
0
```

FIG. 11 curl Ruby Python PHP Java Node Go .NET

```
$   pay curl api /v1/issuing/cards \
>       -u sk_test_BQokikJOvBiT2HlwgH4olfQ2: \
>       -d cardholder=ich_1Cn3pZ1yNTgGUVfz183rasFP \
>       -d type=physical \
>       -d currency=usd \
>       -d shipping[name]="Jenny Rosen" \
>       -d shipping[line1]="1234 Main Street" \
>       -d shipping[city]= San Francisco" \
>       -d shipping[state]=CA \
>       -d shipping[postal_code]=94111 \
>       -d shipping[country]=US
```

FIG. 12

```
1   {
2       "id": "ip1_1Cn4d/1yNTgGDVfzcAYiyuGj":
3       "object": "issuing_transaction",
4       "amount": -109 ,
5       "authorization": "iauth_1Cn4d/1yNTgGDVfzP5fAnvg1" ,
6       "balance_transaction": null ,
7       "card": "ic_1Cm3paTyNTgCDVfzBqq1oqxR" ,
8       "cardholder": null ,
9       "created": 1531401285 ,
10      "currency": "usd" ,
    ...
```

FIG. 13 curl Ruby Python PHP Java Node Go .NET
```
$   pay curl api /v1/issuing/transactions \
>      -u sk_test_BQokikJOvBiT2HlwgH4olfQ2: \
>      -d card=ic_1CoYJR4El2zzzE5GlEDjQiDl \
>      -d created[gte]=1529531619 \
>      -d created[lte]=1529531619
```

FIG. 14 curl Ruby Python PHP Java Node Go .NET
```
$   pay curl api /v1/issuing/authorizations \
>      -u sk_test_BQokikJOvBiT2HlwgH4olfQ2: \
>      -d card=ic_1CoYuRKEl2ztzE5GlEDjQiUl \
>      -d status=pending
```

FIG. 15 curl Ruby Python PHP Java Node Go .NET
```
$   pay curl api /v1/issuing/cards/ic_lCa3paTyNTgGDVfzBqqluqxR \
>      -u sk_test_BQokikJOvBiT2HlwgH4olfQ2: \
>      -d authorization_controls[max_approvals]=10
```

FIG. 16

```
1  {
2      "id": "iauth_ICmMk2lyNTgCDVfzFKICmBgU",
3      "object": "issuing_authorization",
4      "approved": true,
5      "authorization_method": "online",
6      "authorization_amount": 500,
7      "authorized_currency": "usd",
8      "balance_transactions": [
9      ],
10     "card": {
   ...
```

FIG. 17

```
curl Ruby Python PHP Java Node Go .NET $  pay curl api /v1/issuing/authorizations/iauth_ICmMk2lyNTgCDVfzFKICmBgU/approve \
>    -u sk_test_BQokikJOvBiT2HlwgH4olfQ2:
```

PAYMENT PROCESSING METHOD AND APPARATUS USING AN INTERMEDIARY PLATFORM

PRIORITY

This application is a continuation of U.S. application Ser. No. 16/428,650, titled, "PAYMENT PROCESSING METHOD AND APPARATUS USING AN INTERMEDIARY PLATFORM," filed May 31, 2019, which claims priority to and incorporates by reference the corresponding provisional patent application Ser. No. 62/703,292, titled, "PAYMENT PROCESSING METHOD AND APPARATUS USING AN INTERMEDIARY PLATFORM," filed on Jul. 25, 2018 and corresponding provisional patent application Ser. No. 62/678,880, titled, "PAYMENT PROCESSING METHOD AND APPARATUS USING AN INTERMEDIARY PLATFORM," filed on May 31, 2018.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

Embodiments of the present invention relate to the field of systems for processing commercial transactions; more particularly, embodiments of the present invention relate to tracking commercial transactions through separate payments flows to enable settling with netted amounts.

Today, many merchants use third parties to handle all their payment processing needs for commercial transactions. In some cases, the merchants redirect their customers to the third party, who is responsible for capturing the payment information and processing the transaction, or the merchants capture payment information themselves from their customers and send it to a third-party payment gateway for real-time authorization of transactions and subsequent settlement of funds.

There are some transactions in commerce that have multiple payments flows. For example, there are a number of service providers that make purchases or perform services on behalf of customers and then contract with third parties to perform the purchase or service for the customer on their behalf. In such situations, the third parties are often making the purchase or performing part of the service using a payment card. Thus, the transaction between the service provider and the customer has a first payment flow for processing a first payment instrument (e.g., a payment card) transaction to enable the service provide to collect a payment from their customer and a second payment flow for processing a second payment instrument transaction made during the transaction to enable the service provider to make the purchase or perform the service on behalf of the customer. Both the first and second transactions must be settled and then reconciled with each other so that the service provider is able to be paid for their service. Because the two transactions have separate payment flows, there is an inherent delay in having a complete settlement of the service provider's transaction with its customer.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 10-18 illustrates examples of requests and responses used during setup and during payment processing.

DETAILED DESCRIPTION

Figure 1A:
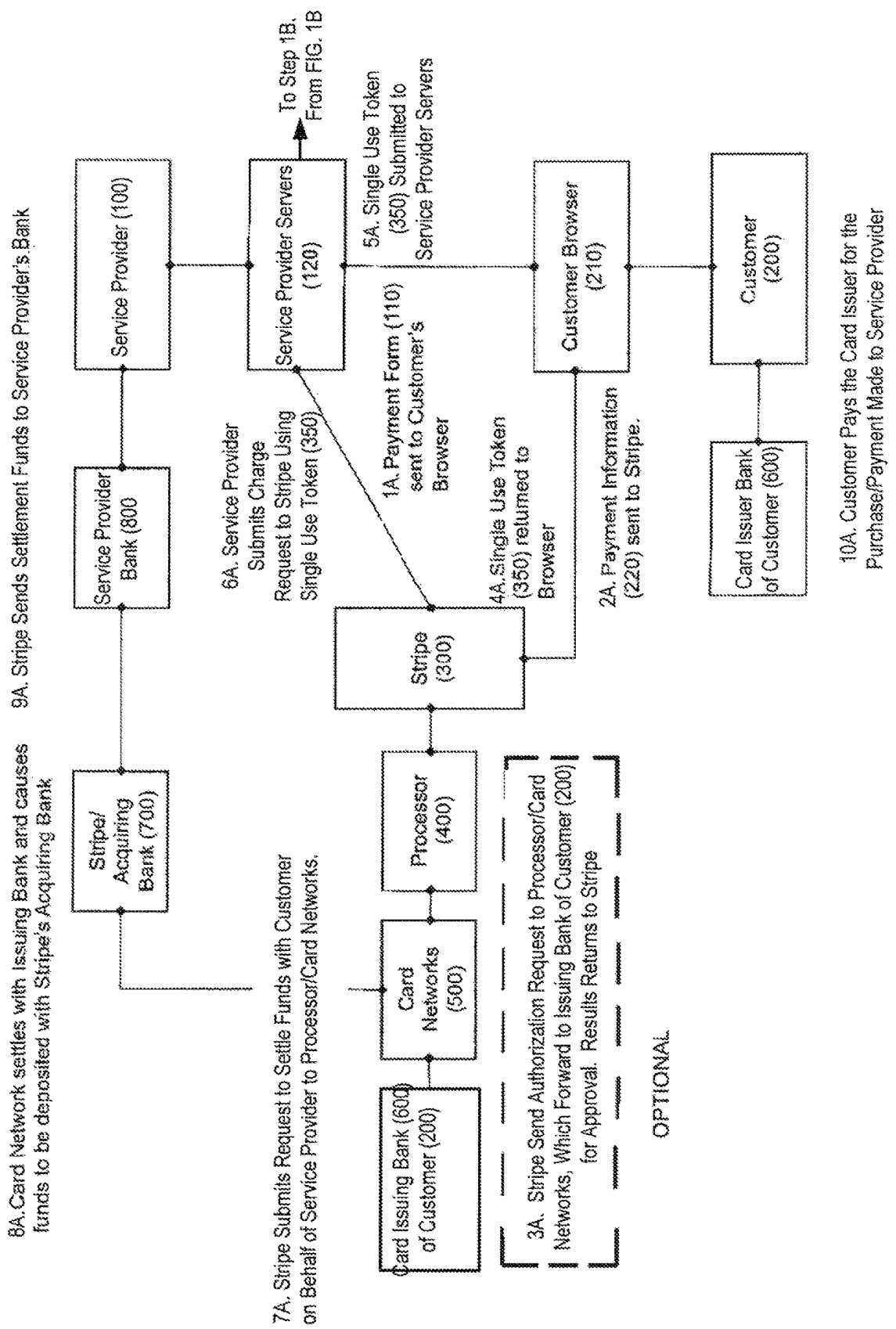
FIGS. 1A and 1B show a flow diagram of the steps and entities for implementing embodiments of the present invention.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Certain terminology is used herein for convenience only and is not to be taken as a limitation on the present invention.

Embodiments of the present invention is described in the context of an online payment acceptance service called Stripe® commercialized by Stripe, Inc., San Francisco, California.

The following definitions are provided to promote understanding of the present invention.

Card Network (or Card Association)—refers to financial payment networks such as Visa®, MasterCard®, American Express®, Diners Club®, JCB® and China UnionPay®.

Processor—A processor is a company (often a third party) appointed to handle credit card transactions. They have connections to various card networks and supply authorization and settlement services to merchants or payment service providers. They can also move the money from the issuing bank to the merchant or acquiring bank.

Acquiring Bank—An acquiring bank (or acquirer) is the bank or financial institution that accepts credit and or debit card payments from affiliated card networks for products or services on behalf of a merchant or payment service provider.

Card Issuing Bank—A card issuing bank is a bank that offers card network or association branded payment cards directly to consumers. The issuing bank assumes primary liability for the consumer's capacity to pay off debts they incur with their card.

Payment Information—In one embodiment for making payment via a credit card or debit card, the payment information includes primary account number (PAN) or credit card number, card validation code, expiration month and year. In another embodiment for making payment via an Automated Clearinghouse (ACH) transaction, the payment information includes a bank routing number and an account number within that bank. The payment information includes at least some sensitive, non-public information.

Merchant—A merchant, as used herein, is an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

Merchant Site—The merchant site is the e-commerce site (e.g., website) of the merchant. The merchant (100) and merchant server (120) in the figures are associated with the merchant site. The merchant site is associated with a client-side (client side) application and a server-side (server side) application. In one embodiment, the merchant site includes Merchant Server (120), and the server-side application executes on the Merchant Server (120).

Customer's Electronic Device—This is the device that the customer uses to interact with the merchant. Examples of this device include a desktop computer, a laptop computer, a mobile device (e.g., smartphone, tablet) and game console. The customer's electronic device may interact with the merchant via a browser application that executes on the device, or via a native app installed onto the customer's device. The client-side application executes on the customer's electronic device.

Payment Processor—A payment processor, as referred to herein, is an entity or a plurality of entities that facilitate a transaction between a merchant site and a customer's electronic device. The payment processor includes selected functionality of both Stripe (300) and Processor (400)/Card Networks (500). For example, in one embodiment, Stripe (300) creates tokens and maintains and verifies publishable (non-secret) keys and secret keys in a manner well-known in the art. See for example, U.S. Pat. Nos. 10,134,036, 9,830,596, and 9,824,354. The Processor (400)/Card Networks (500) is involved in authorizing or validating payment information. In one preferred embodiment, Stripe (300) and the Processor (400)/Card Networks (500) function together to authorize and validate payment information, issue a token, and settle any charges that are made. Accordingly, in one embodiment, the payment processor refers to the functionality of Stripe (300) and the functionality of the Processor (400)/Card Networks (500). In another preferred embodiment wherein step 3A in the high-level description is not performed, and Stripe (300) performs its own verification before issuing a token, the Processor (400)/Card Networks (500) are still used for settling any charges that are made, as described in step 7A in the high-level description.

Accordingly, in this embodiment, the payment processor may refer only to the functionality of Stripe (300) with respect to issuing tokens.

Native Application—A Native Application or "native app" is an application commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a locally installed application. A native application differs from an interpreted application, such as a Java applet, which requires interpreter software. A native application also differs from an emulated application that is written for a different platform and converted in real-time to run, and also differs from a Web application that is run within the browser.

Overview

Techniques are disclosed herein for handling transactions involving multiple payment flows. In one embodiment, a payment processing entity that performs payment processing for payment card-based transactions of a party (i.e., a user or customer of the payment processing entity) while being the card issuer for the cards employed by the party's agent (e.g., independent contractors, etc.) on behalf of that party (user/customer). In one embodiment, the settlement process for these transactions can be streamlined, which is beneficial to the multiple parties involved in the transactions. That is, in one embodiment, the payment processor is the card issuer, which means that payment processor makes the decisions for the authorizations for all the activity of the cards.

In one embodiment, the payment processor, operating as a card issuer, issues the card that is used as a payment instrument as part of a transaction. In one embodiment, if the card issuer is also the payment processor, then the customer of the payment processor, which may be a service provider that uses agents that charge purchases or complete transactions on behalf of the service provider for its customers as discussed above, is able to approve or decline purchases or other transactions made with the customer's cards. The distinctions between typical payment processing and those described herein are illustrated using a set of examples below.

Figure 1B:
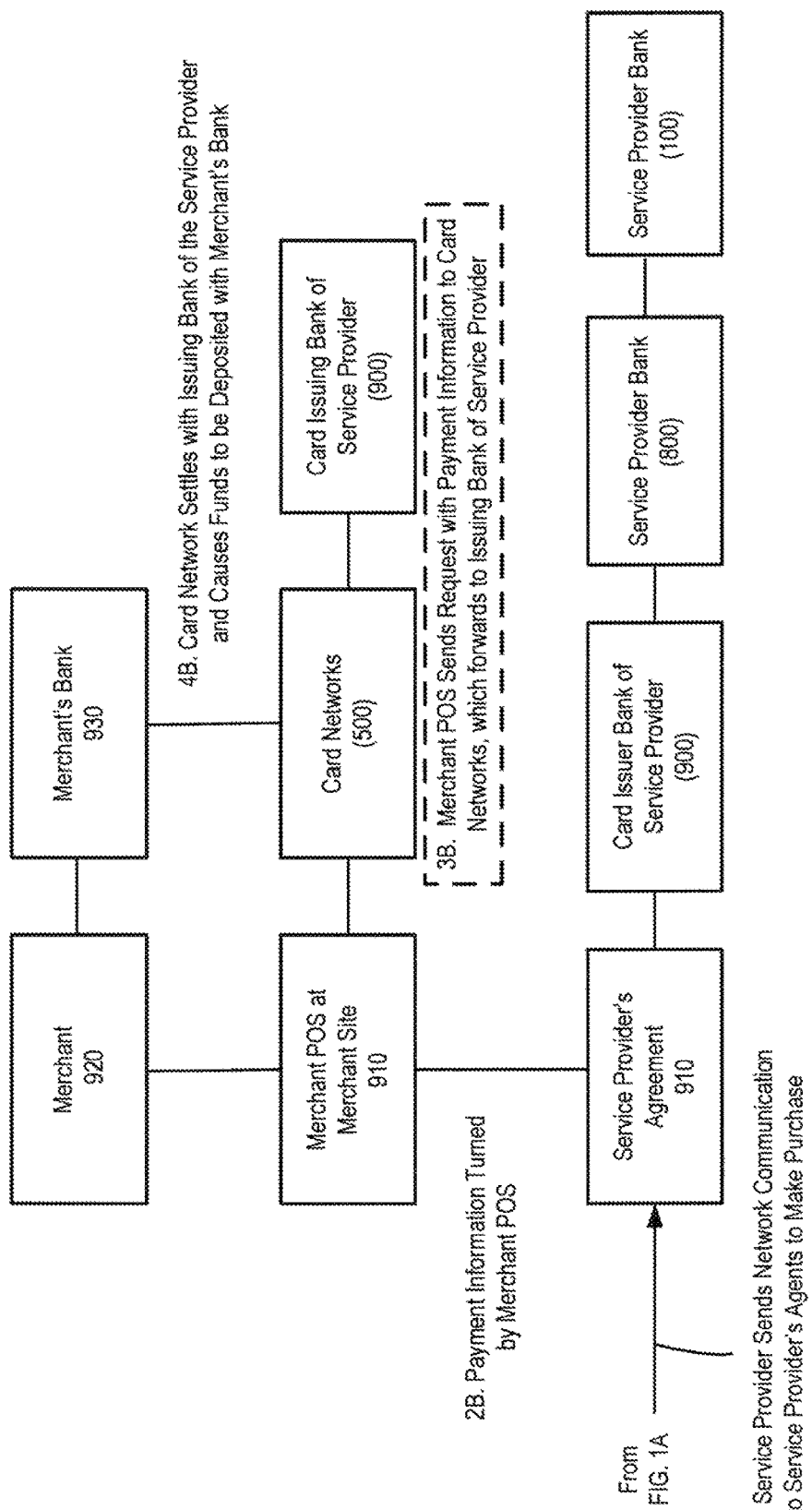

FIGS. 1A and 1B show a flow diagram of the steps and entities for implementing embodiments of the present invention.

At a high level, the payment processing framework described herein works as follows (FIGS. 1A and 1B):

1A. A Service Provider's Customer (200) uses an internet-enabled browser (210) to visit the Service Provider's site. In one embodiment, Customer (200) is served a Stripe.js enabled Payment Form (110) using standard web technologies. Stripe.js is well-known in the art. For more information on Stripe.js, see U.S. Pat. Nos. 10,134,036, 9,830,596, and 9,824,354. The Customer (200) enters the necessary information including their Payment Information (220) and submits the Payment Form (110). The Billing Info portion of the Payment Form (110) is for payment via a credit card or debit card. If payment is to be made via an Automated Clearinghouse (ACH) transaction, the Billing Info portion of the Payment Form (110) will request a bank routing number and an account number within that bank, and possibly additional information, such as the bank name and whether the account is a checking or savings account.

2A. The Customer's payment information (220) is sent from the Customer's browser (210) to Stripe (300), never touching the Service Provider's Servers (120). In this manner, the client-side application electronically sends payment information retrieved from the customer's electronic device to the payment processor. The client-side application does not send the payment information (220) to the server-side application.

3A. In one embodiment, Stripe (300) submits the relevant transaction to a Processor (400) or directly to the Card Network (500) for authorization or validation of the payment information. The Card Network (500) sends the request to the Card Issuing Bank (600), which authorizes the transaction. In this embodiment, Stripe (300) and Processor (400)/Card Network (500) function together as a payment processor. In another embodiment, this step is performed without any communication to the Processor (400)/Card Network (500). Instead, Stripe (300) performs its own authorization or validation of the payment information using heuristic means, such as by checking the Bank Identification Number (BIN), also referred to as the Issuer Identification Number (IIN), against a database of known valid BINs that is on file with Stripe (300). (The BIN is a part of the bank card number, namely the first six digits.) In yet another embodiment, this step is not performed at all since the authorization or validation is not necessary for the next step 4 to succeed. That is, it is acceptable to create a Single-use Token in step 4A that represents payment information which has not been validated in any way.

4A. If authorized, Stripe (300) will generate and return a secure, Single-use Token (350) to the Customer's Browser (210) that represents the customer's payment information (220) but doesn't leak any sensitive information. In the embodiment wherein step A3 is not performed, Stripe (300) performs this step without waiting to receive authorization from the Processor (400) or the Card Network (500). In this manner, the payment processor (here, Stripe (300)) creates the Token (350) from the payment information sent by the client-side application, wherein the Token (350) functions as a proxy for the payment information (220).

5A. The Payment Form (110) is submitted to Service Provider's Servers (120), including the Single-use Token (350). More specifically, the payment processor sends the Token (350) to the client-side application, which, in turn, sends the Token (350) to the server-side application for use by the server-side application in conducting the transaction.

6A. The Service Provider (100) uses the Single-use Token (350) to submit a charge request to Stripe (or to create a Customer object for later use). In this step, Stripe (300) submits a request to authorize the charge to the Processor (400) or directly to the Card Network (500). This authorization specifies the actual amount to charge the credit card. If an authorization was already done in step 3A for the correct amount, this authorization request can be skipped. This may be a one-time payment for a merchant item, or it may involve registering the payment information with the merchant site for subsequent use in making a payment for a merchant item (so-called "card on file" scenario). Using the process described in steps 1A-6A, the payment information can be used by the server-side application via the Token (350) without the server-side application being exposed to the payment information.

7A. Stripe (300) settles the charge on behalf of the Service Provider (100) with the Processor (400) or directly with the Card Network (500).

8A. The Card Network (500) causes the funds to be paid by the Card Issuing Bank (600) to Stripe (300) or to Stripe's Acquiring Bank (700).

9A. Stripe (300) causes the settled funds to be sent to the Service Provider (100) (or to the Service Provider's Bank (800)), net of any applicable fees.

10A. The Card Issuing Bank (600) collects the paid funds from the Customer (200).

1B. In response to the Service Provider (100) submitting the charge request to Stripe (300) in step 6A, the Service Provider instructs Service Provider's Agent (910) to make a purchase for at least one product or order at least one service from Merchant (920) on behalf of the Customer (200).

2B. A Service Provider's Agent (910) visits a Merchant's site (910) and a Merchant's point-of-sale (POS) device obtains payment information of the Service Provider's Agent. account.

3B. The payment information of the Service Provider's Agent (910) is sent from the Merchant's POS with an authorization request directly to the Card Network (500) (or to a payment processor) for authorization or validation of the payment information (i.e., to authorize the charge). The Card Network (500) sends the request to the Card Issuing Bank of the Service Provider (900), which authorizes the transaction. This authorization specifies the actual amount to charge the credit card.

4B. The Card Network (500) causes the funds to be paid by the Card Issuing Bank of the Service Provider (900) to the Merchant (920) (or to the Merchant's Bank (930)), net of any applicable fees.

5B. The Card Issuing Bank of the Service Provider (900) collects the paid funds from the Service Provider (100).

Figure 2A:
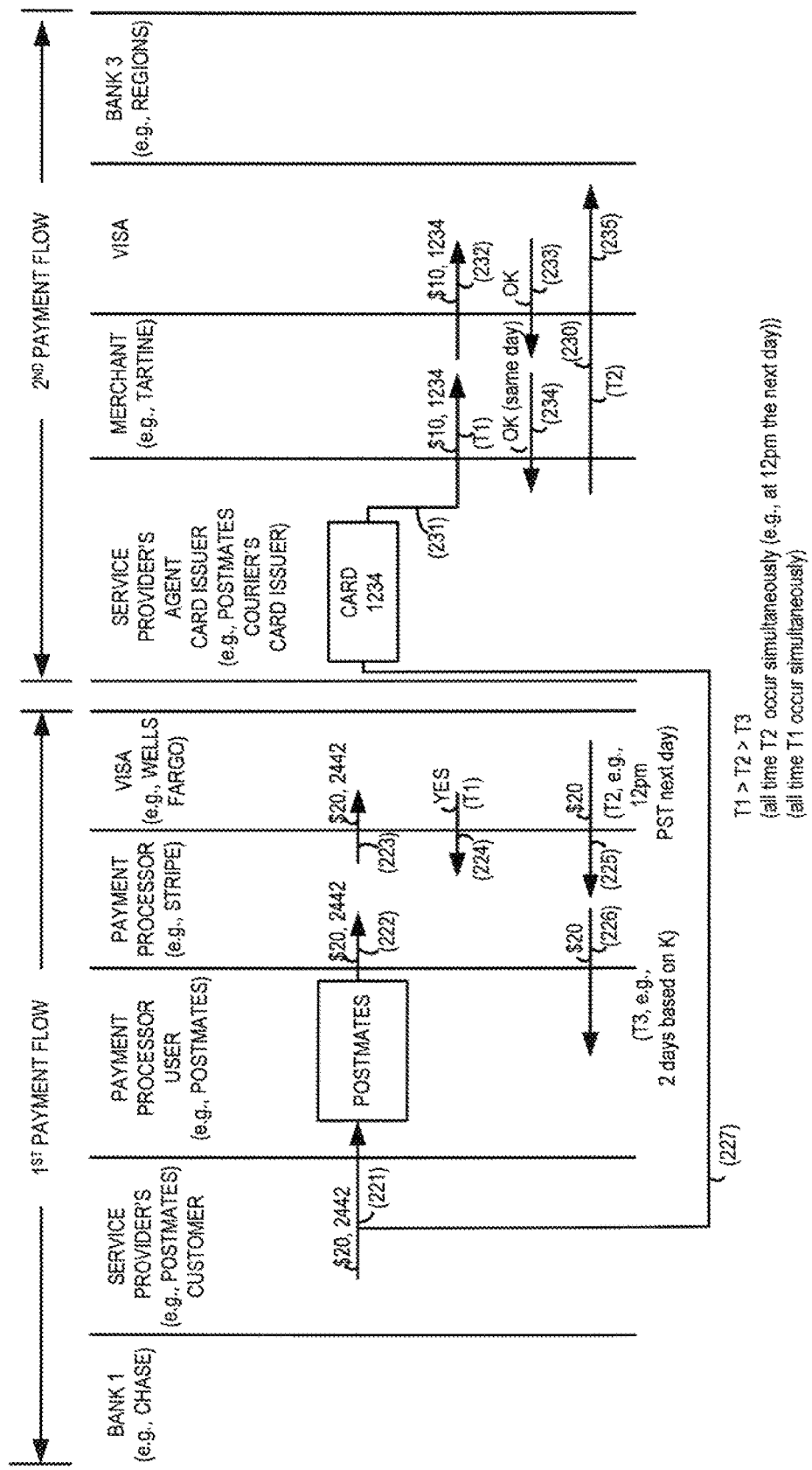
FIG. 2A illustrates one example of a typical transaction in which a payment processing entity handles payments for a user (its customer) while being the card issuer for the cards employed by agents (e.g., independent contractors, etc.) on behalf of that user.

FIG. 2A illustrates one example of a typical transaction in which a payment processing entity handles payments for a user (its customer) while being the card issuer for the cards employed by agents (e.g., independent contractors, etc.) on behalf of that user.

Referring to FIG. 2A, a customer of a service provider wishes to have the service provider make a purchase on its behalf. For example, the customer may want to purchase a sandwich using a service provider such as Postmates, which is part of the on-demand economy that use independent contractors who operate (e.g., buy things) on their behalf (who are buying on behalf of Postmates' customers). The service provider uses a payment processor (e.g., Stripe) to handle their payments, and thus, the service provider is a customer of the payment processor.

In the example, a customer goes to the service provider (e.g., Postmates) and indicates that they want to buy a sandwich from a merchant (e.g., Tartine in the example given). The customer's band is Chase Bank. The service provider takes the customer's payment card (or other payment instrument) (e.g., 2442 representing the last four digits of the card number) (221) and sends a charge authorization message for the transaction amount (e.g., $20) to the payment processor (e.g., Stripe) to cover the cost of having the service provider obtain a sandwich on their behalf (222). In response thereto, the payment processor sends the charge authorization to the paying network (e.g., Visa) in the form of a message (223) containing the transaction amount and the card number of the service provider's customer. Subsequently, the paying network (e.g., Visa) sends a message to the payment processor indicating that the charge authorization has been approved (224). In one embodiment, this occurs at time T1.

Also, after taking the credit card number from their customer, the service provider finds a courier that has a credit card ready in hand and that will buy the sandwich for the service provider's customer for a price (e.g., $10) at the merchant (e.g., Tartine) and signals the courier to do so (227). The payment card used by the courier is the service provider's credit card issued by a company other than the payment processor. For example, in the example, the payment card issuer is the card issuer for Postmates. The courier (e.g., Postmates courier) uses their payment card with card number 1234 and makes the purchase at the merchant (e.g., Tartine). In one embodiment, the merchant obtains the payment card number (e.g., 1234) (231) and the transaction amount (e.g., $10), which forwards it onto the paying network (e.g., Visa) (232).

At this point in the example, there are two payment flows occurring: one payment flow in which the service provider (e.g., Postmates) owes Visa $10 (because the card used by the Postmates courier to buy the sandwich at Tartine is a Visa card) and the customer of the service provider owes the service provider (e.g., Postmates) $20 via the payment processor (e.g., Stripe). Note that the service provider in this example may use another company such as, for example, PEX or WEX, to run their card program.

As for timing, when the customer's request comes into the service provider, the service provider sends an authorization message to the payment processor through an acquiring flow to indicate that the service provider wants to charge a card (e.g., payment card number 4242) (or other payment instrument) for $20 and payment processor sends it out to the paying network (e.g., Visa).

At time T1, the paying network approves the charge and sends a message indicating approval to the payment processor (224). Subsequently, at a predetermined time in the future, time T2 (e.g., 12 pm PST the next day), the paying network provides the funds to the payment processor (e.g., Visa provides $20 to Stripe (225), as the payment processor). At time T3, the payment processor provides the funds from the paying network to the service provider. In the example, Stripe provides the $20 to Postmates at time T3 (226). In one embodiment, the timing of T3 is based on the contract between the payment processor Stripe and the service provider Postmates (e.g., two days after time T2).

Also, at time T1, the service provider's agent makes a purchase at the merchant, in which the amount and the payment card number are provided to the merchant (111). In the example, the service provider Postmates tell their courier to buy the sandwich at the merchant Tartine. In response to receiving the payment card number, the merchant sends a charge authorization request with the payment card number and the transaction amount for buying the sandwich to the paying network (232). In the example, the payment card (e.g., 1234), with both Postmates and the courier's names on it, is used by the Postmates' courier to purchase a sandwich at Tartine. (Postmates owns the card and has a relationship with Visa, which is the paying network for the card). Tartine takes the card and sends an authorization request with the card number and amount to the paying network, which approves the transaction, and Tartine provides the sandwich to the courier (234). At some time later, the paying network Visa provides the $10 to Tartine (233). This usually occurs the same day.

In summary, there are two payment flows of funds for the transaction: 1) the paying network (Visa) to the payment processor (Stripe) in the first payment flow; and 2) the paying network (Visa) to the merchant (Tartine), and both of the flows must be funded. In the example, the paying network Visa reaches out to the customer's bank (e.g., Chase) and indicates the customer's bank owes the payment processor Stripe $20. In response, the customer's bank (e.g., Chase) sends $20 to the paying network Visa and this occurs at time T2. Also, at the same time T2, the card issuer for the service provider gives $10 to the paying network Visa to fund payment to the merchant Tartine for the sandwich (235).

In the example of FIG. 2A, all time T1 events occur simultaneously and all time T2 events occur simultaneously, and thus, both flows start at time T1 and everything is settled at the same time T2 (e.g., 12 pm PST). That is, all the funds move at the same time. Thus, in this example, the payment processor (e.g., Stripe) gets $10 the next day from the service provider (Postmates) and owes the paying network (Visa) $10 for the transaction. For that $20 transaction, the service provider is to receive $20 but $10 of that is to be sent to their card issuer to pay for the paying network (Visa) for the purchase from the merchant by their agent.

As discussed in more detail below, in one embodiment, the payment processor (e.g., Stripe) handles both payment flows and the service provider (e.g., Postmates) is able to have a single view of the flow of funds. In one embodiment, this is accomplished by having the payment processor act as the service provider's card issuer. If the payment processor is also the service provider's card issuer (e.g., the card issuer for Postmates), then the payment processor would have the obligation to make a payment to the paying network (Visa) to cover the cost of the purchase by the service provider's agent. In other words, in the example in FIG. 2A, the payment processor (Stripe) would have to pay the $10 to the paying network (Visa) as the card issuer for Postmates in response to the purchase of the sandwich by the Postmates' courier from the merchant (Tartine). Thus, the service provider (Postmates) has an obligation to the paying network (Visa) as the service provider's card issuer and the funds for that comes from the payment processor (Stripe). This money comes from the bank of the payment processor (Stripe). Note that this results in a shortfall for the payment processor (Stripe) in that it's an unfunded mandate that must be paid.

Also, in the example, the payment that is made by the payment processor to the service provider (i.e., its customer) at time T3 is contractually set. If the agreement between the payment processor and the service provider is such that the payment processor is able to batch transactions of the service provider for settling a number of transactions at the same time, time T3, then the payment processor is able to net out some transactions and only pay the netted-out amount to the service provider. For example, since the time T2 obligations occur simultaneously, the payment processor (Stripe) gets the $20 from the paying network (Visa) (for the first flow) and pays $10 to paying network (Visa) (for the second flow) at the same time, which effectively gives the payment processor (Stripe) a netted amount of $10.

Figure 2B:
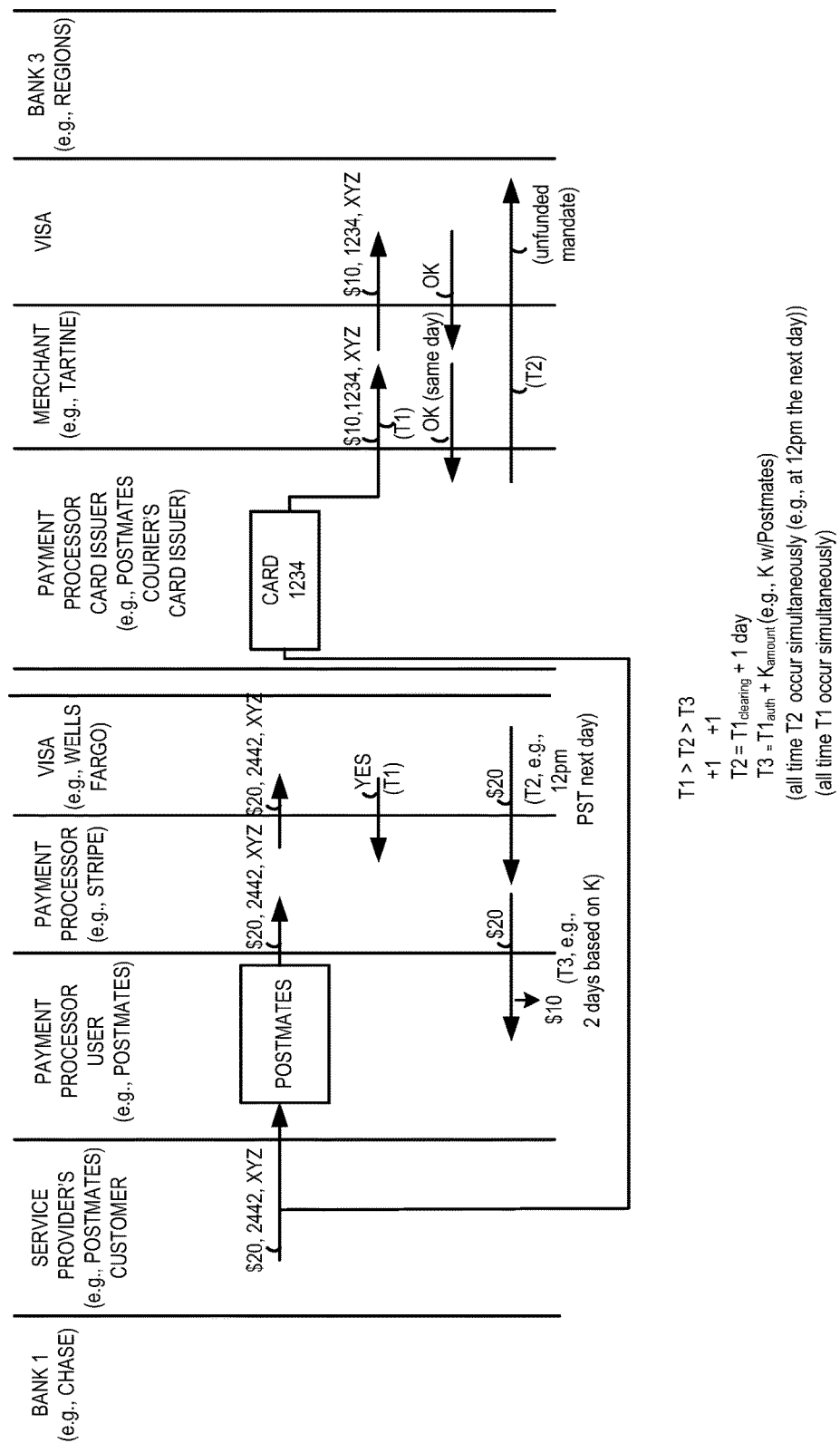
FIG. 2B illustrates one embodiment of the alternative payment processing flow in which the payment processor and the service provider's card issuer are the same entity

FIG. 2B illustrates one embodiment of the alternative payment processing flow in which the payment processor and the service provider's card issuer are the same entity. In contrast to the payment processing flow depicted in FIG. 2A, the payment processor Stripe is the card issuer for the service provider (Postmates) card used by the service provider's (Postmates') courier to purchase the sandwich at the merchant (Tartine). Therefore, the obligation to the paying network (Visa) for the $10 sandwich purchased from the merchant (Tartine) by the Postmates courier is Stripe's obligation. However, at the time of funding that obligation, the payment processor (Stripe) hasn't received that $10 yet from the service provider (Postmates). Thus, there is a shortfall.

As the payment processor (Stripe) has become the card issuer, in one embodiment, the payment processor is allowed to have a negative balance, with a promise that within a period of time (e.g., 3 hrs) after the funds are wired to the payment processor (Stripe), the payment processor (Stripe) agrees to pay for the $10 obligation (i.e., the obligation that caused a shortfall). In one embodiment, if the funding does not occur within that time period, then the payment processor (Stripe) incurs a penalty (e.g., prime plus 4%).

To facilitate the handling of transactions with shortfalls, in one embodiment, the bank of the payment processor is paid by a predetermined time (e.g., 10 am the next morning) and agrees to pay the payment processor (Stripe) a predetermined period of time (e.g, two hours later) so that the payment processor meets the T2 timing. Thereafter, the payment at time T3 from the payment processor (Stripe) to the service provider (Postmates) can be met. Thus, in the example in FIG. 2B, from a timing standpoint, time T3 equals time T1 authorization plus the amount specified in the contract with Postmates, while time T2 equals the time T1 clearing plus 1 day.

Since the service provider (Postmates) is parking its money (e.g., the $20) with the payment processor (Stripe) and the payment processor (Stripe) has paid the $10 already as the card issuer, the payment processor (Stripe) provides only the netted out amount of $10 to service provider (Postmates) and not the $20 that it originally received from the customer's paying network (Visa). Thus, this arrangement reduces the amount of time when the paying network (Visa) gets it from them and the payment processor gets it from the paying network (Visa).

To facilitate the settlement process for the transaction, each transaction is tagged (e.g., XYZ in FIG. 2B) by the service provider (Postmates). The same tag is used by the service provider's agent (e.g., Postmates' courier). In one embodiment, at a predetermined time in the future, tags are matched by the payment processor, which allows for netting out transactions to occur because the payment processor (Stripe) can determine that payments being made to service provider (Postmates) corresponds to a payment already made by the payment processor (Stripe) to the paying network (Visa) as the card issuer for service provider's (Postmates') payment cards, and thus, in this manner, the netting operation may be performed.

The payment processor (Stripe) is able to track all the specifics of the transaction, including the merchant and the amount paid to the merchant (Tartine). Because all of this being tracked, a particular service provider (Postmates) can determine the amount of money that is being charged in its name.

In one embodiment, the payment processor performs fraud protection. In one embodiment, this is performed by a risk analyzer of the payment processing system. The risk analyzer evaluates transactions seeking authorizations and is able to generate a fraud score or other information that indicates that a particular transaction is or is not fraudulent. At time T1, the payment processor (Stripe) knows that there is a receivable coming in because they are notified by the service provider (Postmates, which is Stripe's user). Now the payment processor (Stripe) can determine an amount of money that is going to be charged to a card near a merchant (Tartine). Thus, the information being collected as part of a payment flow is used to determine fraud on the part of the transaction occurring with the other payment flow. Therefore, this information can be used for fraud to determine if the card should be used (based on history). In one embodiment, the history for each of the cards is tracked, and when it is going to be used at one of the locations (e.g., a courier using it at Tartine), the amount and other transaction details can be evaluated to determine if it appears to be a normal amount based on the history. Using that determination, the payment processing system is able to make a determination that a transaction appears to be a normal transaction.

In one embodiment, as part of handling a payment flow, when performing transactions for the service provider (Postmates), the payment processor (Stripe) is able to maintain a running balance, and provide the same to a customer such as a service provider. Such a balance can be increased at time T1 and decreased at time T3.

Transactions

In one embodiment, the payment flow transactions to purchase goods or services are handled by the payment processor. In one embodiment, any purchase event that causes funds to enter or leave an account of a customer of the payment processor is represented as a transaction object. In one embodiment, captures, refunds, and ATM usage are all represented as transactions.

In one embodiment, transactions are approved or rejected in real-time. In one embodiment, a customer of the payment processor approves or declines purchases (or other transactions) in response to authorization requests received from the payment processor. These authorizations may occur as soon as a card issued to the customer by the payment processor is activated.

Figure 3:
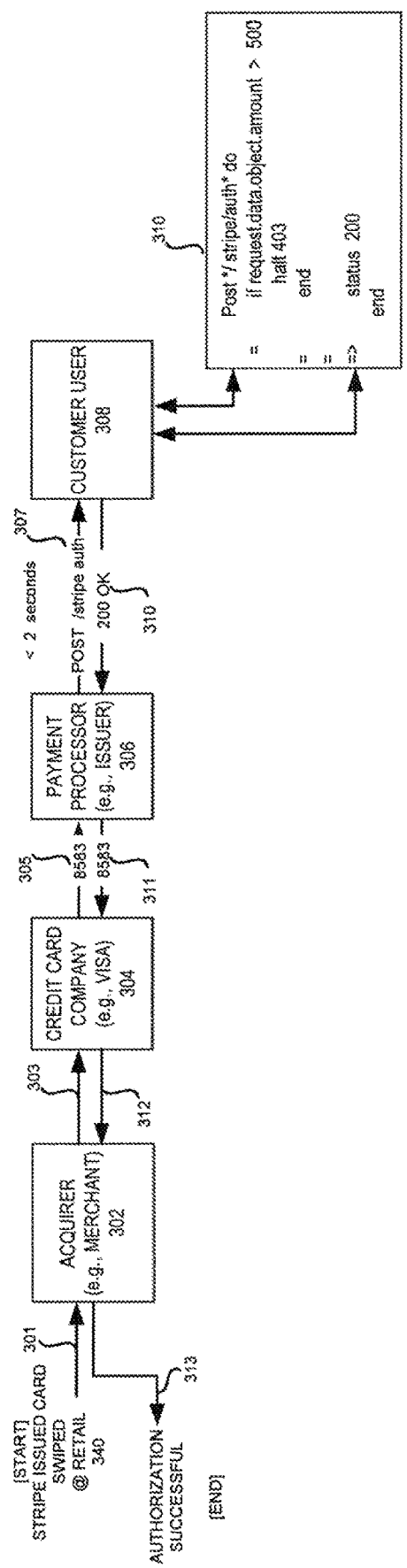
FIG. 3 illustrates a data flow for approving or rejecting a transaction in accordance with one embodiment.

FIG. 3 illustrates a data flow for approving or rejecting a transaction in accordance with one embodiment. Referring to FIG. 3, the data flow begins with an acquirer 302 (e.g., a merchant) acquiring card information 301. This may occur in a number of ways, such as, for example, by swiping a card 340 by an acquirer 302, inserting the card into a reader so that an EMV chip is read, wirelessly or other contactless transmission of card information 301, etc. These operations may occur at a retail location. Transaction information is sent via signals 303 from acquirer 302 to a paying network 304 (e.g., Visa). In one embodiment, signals 303 include transaction information. In one embodiment, the transaction information includes one or more of a number indicative of an account (e.g., a payment card number, a token, etc.), a transaction amount, an acquirer identifier (e.g., a merchant identifier) or category, acquirer location, a statement descriptor with a card holder's application data (e.g., user activity, user location, etc.), information indicative of goods and/or services that are being acquired as part of the transaction, etc.

Paying network 304 sends the information via signals 305 to a payment processor 306, which is also the issuer of card 340, to be approved or declined synchronously. In one embodiment, signals 305 comprise raw 8583 messages.

In response to signals 305, payment processor 306 forwards an authorization request 307 to the payment processor's customer 308, which is customer to which card 340 was issued. In one embodiment, card 340 is used by an agent (e.g., independent contractor) of customer 308.

In one embodiment, once the card is activated, the payment processor's customer automatically receives webhooks for every authorization. In one embodiment, the webhook having the authorization request comprises a POST hook. In one embodiment, the webhook contains the authorization object, which includes information such as, for example, but not limited to, the transaction amount, an indication of the card being used (e.g., a card number or identifier), and merchant properties. Below is an example webhook handler that approves authorizations under $100 and declines all other requests.

```
post '/stripe/issuing/authorization_approval' do
    event = JSON.parse(request.body.read)
    auth = event['data']['object']
    if auth['currency'] == 'usd' && auth['amount'] < 10000
        return 200
    end
    403
end
```

Returning to FIG. 3, in one embodiment, in response to the authorization request, customer 308 performs a test 310 to determine whether to approve or decline the authorization request. The results of test 310 are sent via signals 310 from customer 308 to payment processor 306.

In one embodiment, the cardholder waits for the authorization response. Since the cardholder waits for this authorization response (e.g., at a point of sale terminal), the customer's endpoint handling the response issues its response within a predetermined period of time (e.g., within 2 seconds). In one embodiment, because customer 308 approves or declines the authorization request in real-time, the time from when payment processor 306 sends the authorization request to customer 308 and receives a response from customer 308 indicating customer 308 is approving or declining the authorization request is less than 2 seconds. In one embodiment, if the customer's endpoint takes longer than the predetermined period of time to respond (e.g., takes longer than 2 seconds to respond), the payment processor automatically declines the authorization.

In response to signals 310 indicating approval, payment processor 306 sends signals 311 to credit card company 304 indicating approval or declining the authorization to charge the credit card of the card of customer 308 used with acquirer 302. Credit card company 304 forwards the approval/decline indication 312 to acquirer 302 that indications whether card 340 is authorized for use in the transaction. In response thereto, acquirer 303 provides an indication 313 of whether the authorization was successful.

When customer 308 approves an authorization, a mechanism ensures that customer 308 has funds to cover the ensuing purchase. In one embodiment, the balance changes for a purchase are as follows:
1) upon authorization, payment processor 306 (e.g., card issuer) deducts the authorization amount from the available balance of customer 308 so that it is placed in a "held" state; and
2) upon clearing, payment processor 306 releases the held authorization amount and deducts the clearing amount from the available balance of customer 308.

In one embodiment, batches of clearing records are received by the payment processor. Each of these clearing records has an authorization amount. These authorization amounts relate to captures and refunds. They indicate that funds will be debited from the funding account of the payment processor on the following day. In one embodiment, the clearing records are cleared on a daily basis. In one embodiment, lifecycle for a typical purchase is as follows. First, a customer approves an authorization request from a merchant, which creates an authorization object in a pending state. Second, the merchant captures the existing authorization within seven days. At this point, the authorization moves to the closed state, and a new transaction object is created with type capture.

Figure 4:
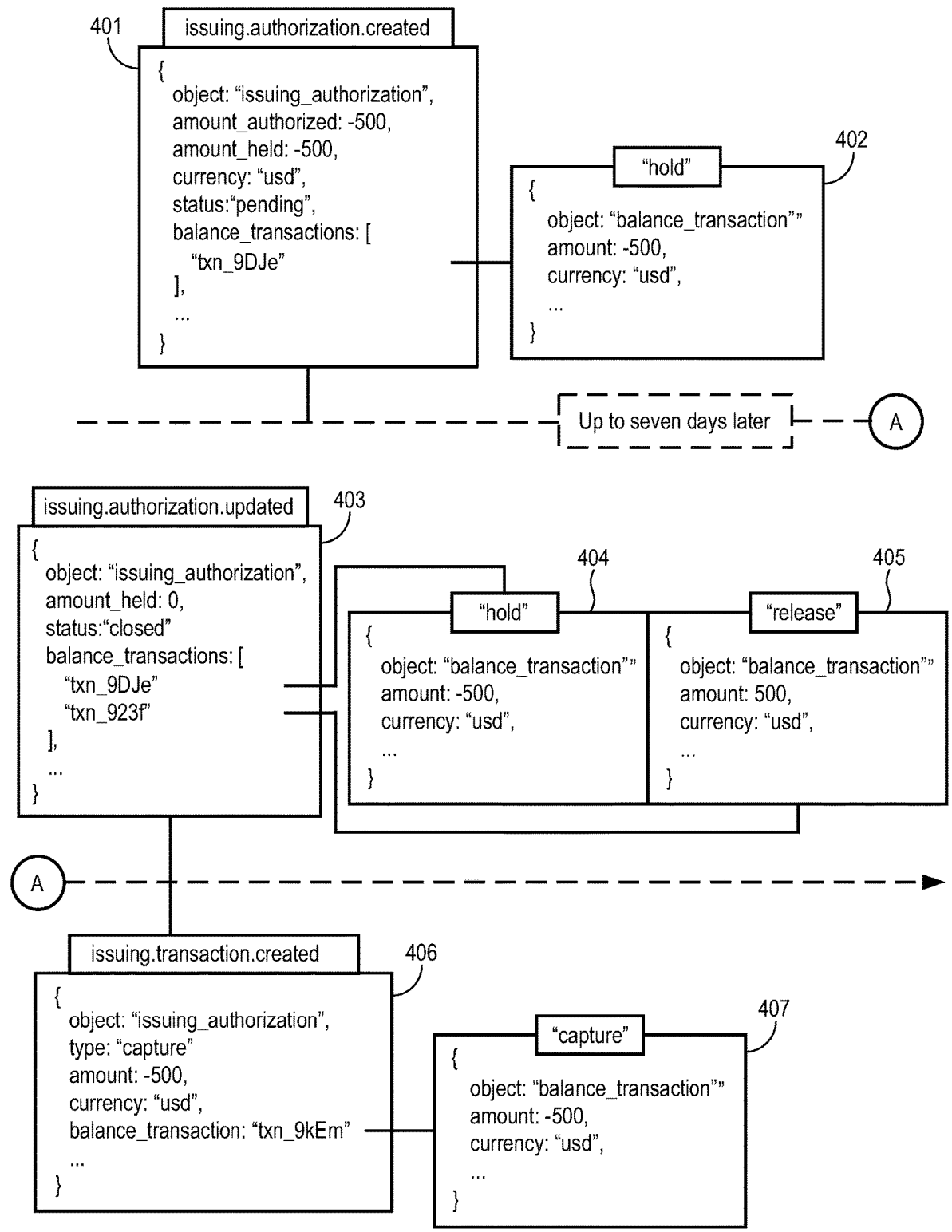
FIG. 4 illustrates authorization and captures states for a transaction in accordance with one embodiment.

FIG. 4 illustrates authorization and captures states for a transaction in accordance with one embodiment. These states include:

1) issuing.authorization.created (401) and its associated hold state (402);
2) issuing.authorization.updated (403) and its associated hold state (404) and associated release state (405);
3) issuing.transaction.created (406) and its associated capture state (407)

For the issuing.authorization.created (401) and its associated hold state (402), in one embodiment, when an activated card is charged, the payment processor sends an issuing.authorization.request webhook in real-time to a universal resource locator (URL) of the customer, which represents a designated endpoint of the customer of the payment processor for handling responses to the authorizations. The endpoint's response controls whether the authorization is approved or declined. In one embodiment, the customer's endpoint approves a transaction by responding to the authorization with a HTTP status code 200 and declines a transaction by responding to the authorization with HTTP status code 403, with all other status codes resulting in declines and logged as warnings.

In one embodiment, by approving an authorization request, a payment processor's customer creates an authorization object in the pending state and the authorization holds an amount from the customer's balance (with the payment processor/card issuer) in reserve until the authorization is captured or voided. In one embodiment, some merchant categories are permitted to capture more than the authorization amount, and thus, the held amount varies by merchant.

Once approved, the rest of the events in an authorization's lifecycle occur outside of the customer's control. In one embodiment, after approval, one of the following actions updates the authorization to the closed state and trigger an issuing.authorization.updated event:
1) The merchant captures the authorization. This is accompanied by the creation of a transaction object; or
2) The merchant voids the authorization. This occurs when the merchant refunds the authorization before capturing.

For issuing.transaction.created (406) and its associated capture state (407): in one embodiment, when a merchant captures an authorization, the following changes occur simultaneously: 1) the authorization releases the previously-held funds via a new balance transaction, a new transaction object is created to represent the capture, where the object references a new balance transaction that deducts the full capture amount from your balance; and the authorization object's status updates from pending to closed. Once an authorization reaches the closed state, the purchase is considered final. After that point, no additional transaction objects of type "capture" may be created.

Exemplary Data Flows

Figure 5:
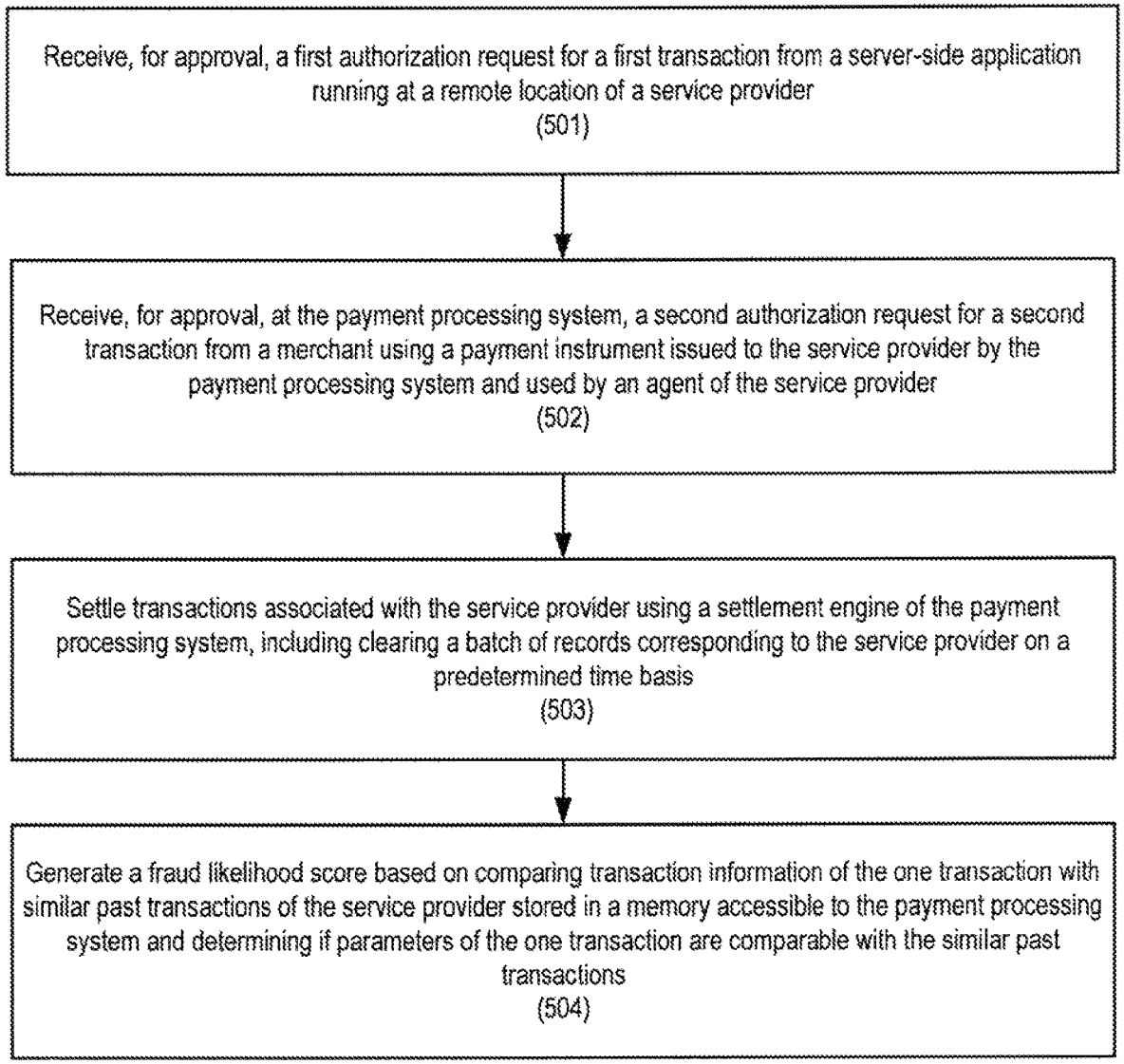
FIG. 5 is a flow diagram of one embodiment of a process for processing transactions.

FIG. 5 is a flow diagram of one embodiment of a process for processing transactions. In one embodiment, the processes are performed by processing logic that may comprise hardware (circuitry, dedicated logic, etc.), software (e.g., software running on a chip), firmware, or a combination of the three. In one embodiment, the process is performed by a payment processing system of a payment processor.

Referring to FIG. 5, the process begins electronically receiving, for approval, a first authorization request for a first transaction from a server-side application running at a remote location of a service provider (processing block 501). In one embodiment, the first authorization request is received at a payment processing system. In one embodiment, the first authorization request includes a first transaction amount, first tracking information (e.g., a tag or other identifier (ID) identifying a transaction associated with the first authorization request) and first payment information specifying a first payment amount.

Next, processing logic electronically receives, for approval, at the payment processing system, a second authorization request for a second transaction from a merchant using a payment instrument (e.g., a payment card, credit card, etc.) issued to the service provider by the payment processing system and used by an agent of the service provider (processing block 502). In one embodiment, the second authorization request is received at the payment processing system. In one embodiment, the second transaction request includes a second transaction amount, second tracking information (e.g., tag or ID identifying the transaction request) and a payment information specifying a payment amount.

Subsequently, processing logic settles transactions associated with the service provider using a settlement engine of the payment processing system, including clearing a batch of records corresponding to the service provider on a predetermined time basis by comparing, with a tracking engine of the payment processing system, transaction tracking information associated with authorization requests to net out individual transactions, including determining the first and second request authorization requests are related to a single transaction using the tracking information, and adjusting an available balance of the service provider by a netted amount between the first and second transaction amounts (processing block 503).

In one embodiment, the process of FIG. 5 optionally includes generating a fraud likelihood score based on comparing transaction information of the one transaction with similar past transactions of the service provider stored in a memory accessible to the payment processing system and determining if parameters of the one transaction are comparable with the similar past transactions (processing block 504).

Figure 6:
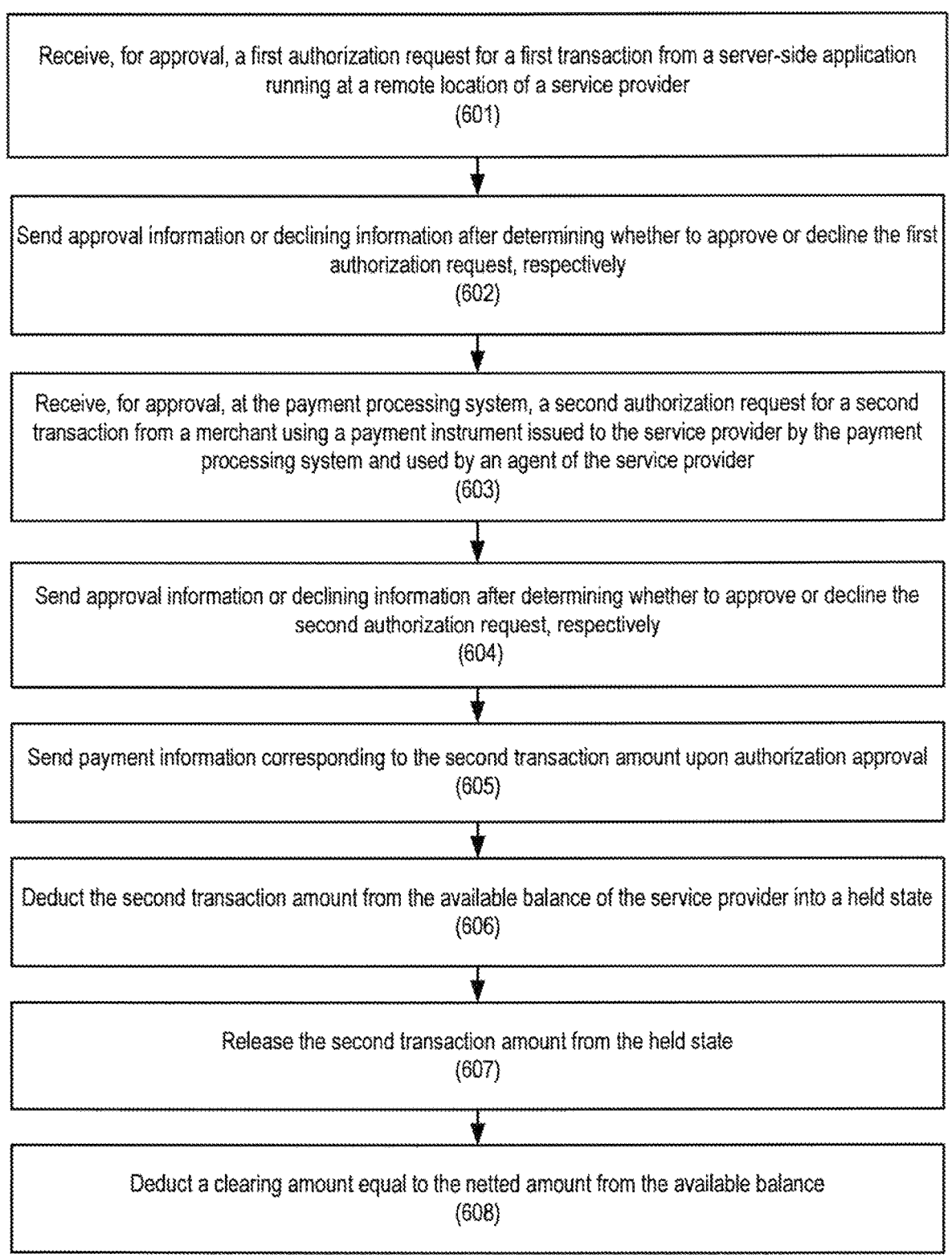
FIG. 6 is a more detailed flow diagram of one embodiment of a process for processing transactions.

FIG. 6 is a more detailed flow diagram of one embodiment of a process for processing transactions. In one embodiment, the processes are performed by processing logic that may comprise hardware (circuitry, dedicated logic, etc.), software (e.g., software running on a chip), firmware, or a combination of the three. In one embodiment, the process is performed by a payment processing system of a payment processor.

Referring to FIG. 6, the process begins electronically receiving, for approval, a first authorization request for a first transaction from a server-side application running at a remote location of a service provider (processing block 601). In one embodiment, the first authorization request is received at a payment processing system. In one embodiment, the first authorization request includes a first transaction amount, first tracking information (e.g., a tag or other identifier (ID) identifying a transaction associated with the first authorization request) and first payment information specifying a first payment amount.

In response thereto, processing logic electronically sends approval information or declining information after determining whether to approve or decline the first authorization request, respectively (processing block 602). In one embodiment, approving or declining an authorization is performed via a POST hook electronically sent from the payment processing system and the service provider.

Next, processing logic electronically receives, for approval, at the payment processing system, a second authorization request for a second transaction from a merchant using a payment instrument (e.g., payment card, credit card, charge card, etc.) issued to the service provider by the payment processing system and used by an agent of the service provider (processing block 603). In one embodiment, the second authorization request is received at the payment processing system. In one embodiment, the second transaction request includes a second transaction amount, second tracking information (e.g., tag or ID identifying the transaction request) and a payment information specifying a payment amount.

Then, processing logic electronically sends approval information or declining information after determining whether to approve or decline the second authorization request, respectively (processing block 604).

Subsequently, processing logic sends payment information corresponding to the second transaction amount upon authorization approval (processing block 605) and deducts the second transaction amount from the available balance of the service provider into a held state (processing block 606). In one embodiment, these operations are performed by a settlement engine of a payment processing system. In one embodiment, the payment processing system electronically sends information authorizing the second payment for the second transaction amount to the merchant prior to receiving payment for settlement of the second payment from the service provider.

When performing clearing records, processing logic releases the second transaction amount from the held state (processing block 607) and deducts a clearing amount equal to the netted amount from the available balance (processing block 608). In one embodiment, these operations are performed by a settlement engine of a payment processing system. In one embodiment, the records comprise captures and refunds related to the first and second transactions that form one transaction. In one embodiment, the clearing operation occurs at a predetermined time (e.g., 12 pm the day after the second authorization request is generated and approved).

In one embodiment, the operation of clearing records includes comparing transaction tracking information (e.g., tags, IDs, etc.) associated with transactions to determine which are related to each other, if any. In one embodiment, this is performed using a tracking engine of a payment processing system. When transactions are identified as being related to each other, the amounts associated with those transactions can be settled together by combining the amounts associated with the two transactions, thereby netting out individual transactions. Once a netted-out amount is available, the settlement engine of the payment processing system adjusts an available balance of the service provider.

Figure 7:
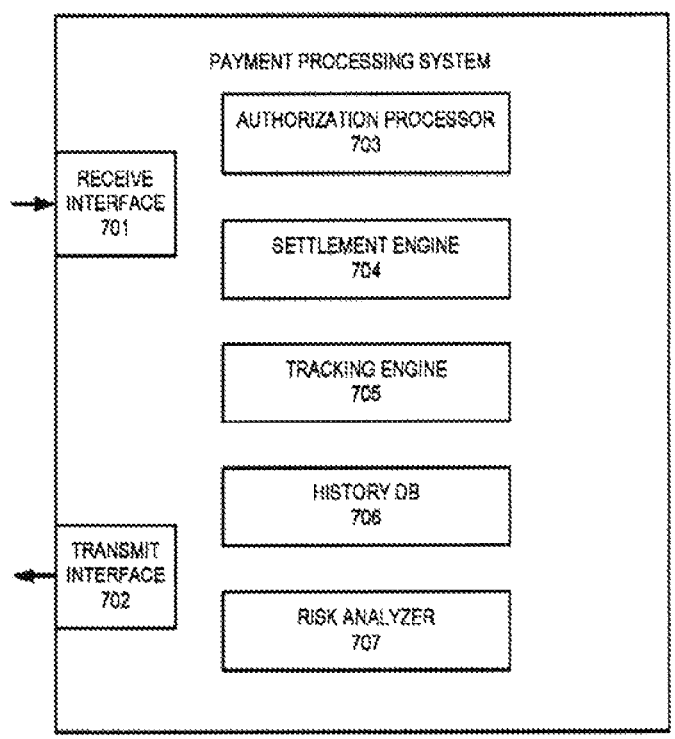
FIG. 7 is a block diagram of one embodiment of a payment processing system.

FIG. 7 is a block diagram of one embodiment of a payment processing system. The payment processing system comprises hardware (circuitry, dedicated logic, etc.), software (e.g., software running on a chip), firmware, or a combination of the three. While the payment processing system is shown as one system, in one embodiment, the payment processing system is implemented with more than one system (e.g., a plurality of processing devices, servers, computer systems, etc.).

Referring to FIG. 7, the payment processing system comprises a receive interface 701 and a transmit interface 702. Note that these may be the same interface. Receive interface 701 and transmit interface 702 communication transaction information, including payment authorization requests and responses between the customers, merchants, service providers and paying networks.

In one embodiment, the payment processing system includes an authorization processor 703 for authorizing transactions and funding transfers, and performs other authorizations functions are described herein.

In one embodiment, the payment processing system includes settlement engine 704 for settling transactions including netted out transactions amounts between payment flows as described herein.

In one embodiment, the payment processing system includes tracking engine 705 for tracking transactions, including those with multiple payment flows, to enable settlement to be performed by netting transaction amounts of multiple payment flows. In one embodiment, tracking engine 705 exchanges information with settlement engine 704 to enable settlement engine 704 to perform the netting of transaction amounts. That is, tracking engine 705 determines when transactions associated with different payment flows are related to each other so that settlement engine 704 is able to adjust a customer's balance based on a netted amount between the related payment flows.

In one embodiment, the payment processing system includes history database 706 to store transaction history. Such transaction history may include all of the customer's transactions because the payment processor is the card issuer. The transaction history is provided to the payment processor's customers for use in analyzing their transaction information. In one embodiment, transaction history is provided to tracking engine 705 to facilitate the determination that transactions of different payment flows are related to each other.

In one embodiment, the payment processing system includes risk analyzer 707 to make fraud determinations based on the transaction information, such as, for example, as described above. In one embodiment, risk analyzer 707 uses transaction information from history database 706 along with information of pending transactions awaiting approval to detect fraud with respect to the pending transactions. In one embodiment, risk analyzer 707 generates a fraud score or other fraud indication for each transaction it analyzes.

Note that the payment processing system includes other functional units and performs other well-known operations associated with payment processing.

Figure 8:
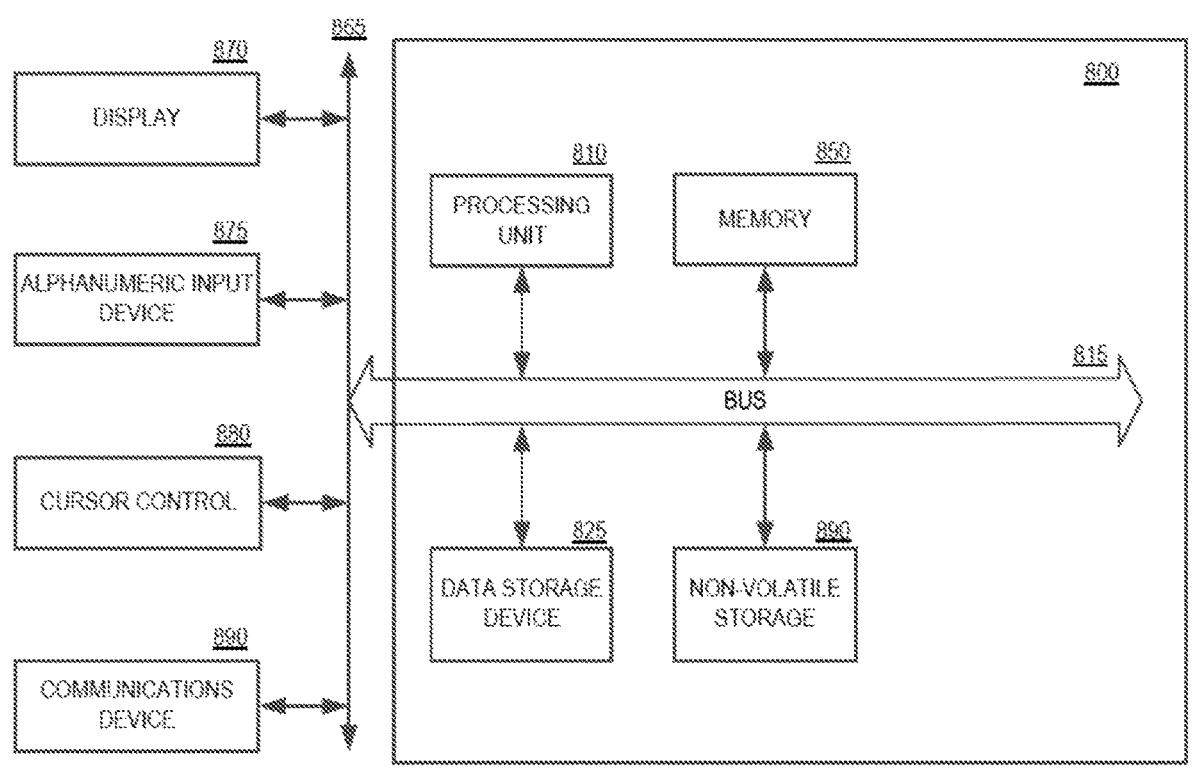
FIG. 8 is a block diagram of one embodiment of a computer system.

FIG. 8 is one embodiment of a computer system that may be used to support the systems and operations discussed herein. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random-access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 610, and a data storage device 825 such as a magnetic disk or optical disk and its corresponding disk drive. Data storage device 825 is coupled to bus 815 for storing information and instructions.

The system may further be coupled to a display device 870, such as a light emitting diode (LED) display or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The embodiments discussed herein may also be embodied in a handheld or portable device containing a subset of the computer hardware components described above. For example, the handheld device may be configured to contain only the bus 518, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

An Intermediary Platform

Figure 9:
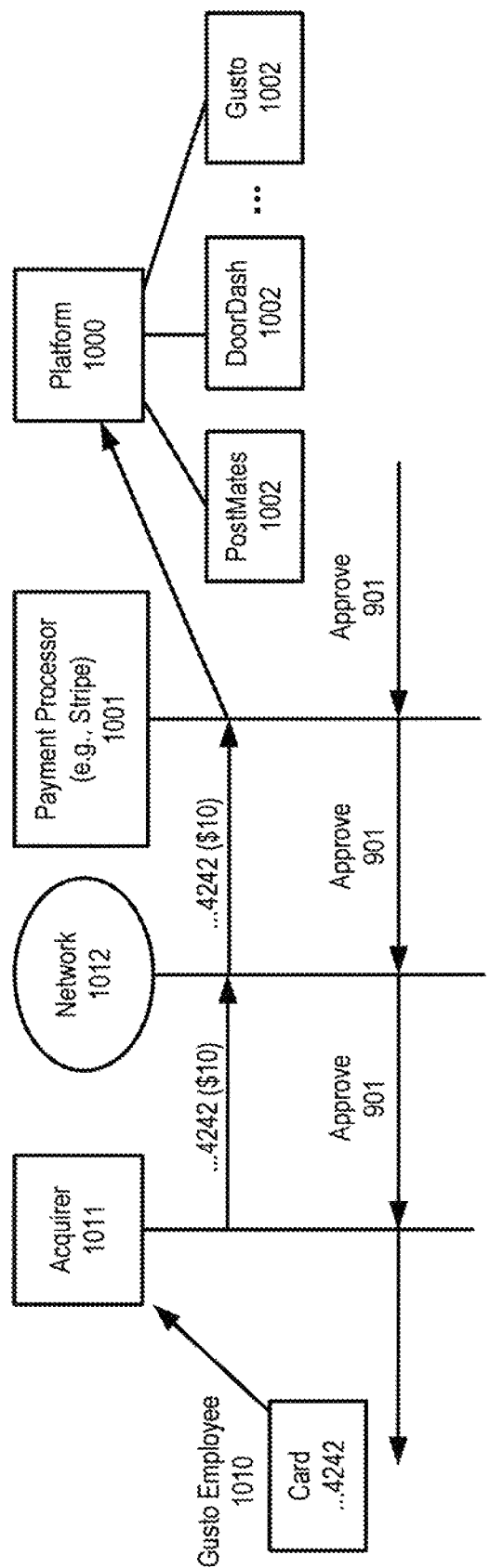
FIG. 9 illustrates an alternative payment flow that employs an intermediary platform between a payment processor and one or more payment processor users.

In one embodiment, the payment processor (e.g., Stripe) and the payment processor user do not interact directly in the first payment flow as described above. In such a case, an intermediary platform interfaces a number of payment processor users (e.g., PostMates, DoorDash, Gusto, etc.) to the payment processor. FIG. 9 illustrates an example of the alternative first payment flow. Referring to FIG. 9, platform 1000 interfaces to payment processor 1001 and one or more payment processor users 1002

The intermediary platform 1000 provides services to its customers, which are the payment processor users 1002. In one embodiment, platform 1000 understands the permissions and authorizations that it assigns to each of its users 1002, thereby allowing platform 1000 to make authorizations decisions in real-time. The permissions include, for example, the dollar amount of a transaction (e.g., a purchase) below which the transaction will be approved automatically. Other examples of permissions that may be used include pre-authorized MCC codes, pre-authorized zip code, and others.

When a transaction occurs and is forwarded to payment processor 1001, payment processor 1001 first checks to determine whether the platform user has applied any authorization controls to the card that would cause payment processor 1001 to decline the request. In one embodiment, payment processor 1001 employs a static set of rules to the situation to determine if it should decline the transaction. If payment processor 1001 determines the platform user hasn't applied any authorization controls to the card that would cause payment processor 1001 to decline the transaction, such that the transaction is allowed, payment processor 1001 sends the request to platform 1000 to determine whether the platform user has configured an authorization endpoint (e.g., platform 1000) to handle authorization requests. If so, payment processor 1001 sends the request to platform 1000 to approve or decline the request. In one embodiment, the request is sent as an event to platform 1000. In response to the request, platform 1000 applies one or more rules to determine if the transaction is authorized and, if so, approves the transaction. In one embodiment, the entire approval process needs only a few seconds to complete and occurs while the cardholder and business wait for the response.

Referring to FIG. 9, when a payment processor user (e.g., Gusto Employee 1010) makes a purchase, their card number (e.g., . . . 4242) along with the transaction amount (e.g., $10) and other transaction data (e.g., merchant identifier, user's employee identifier, user's balance, etc.) is sent to acquirer 1011, which forwards it on to network 1012, which in turn forwards it to payment processor 1001 (e.g., Stripe). Payment processor 1001 applies any authorization controls to the card associated with the number (e.g., . . . 4242) that would cause payment processor 1001 to decline the request. If payment processor 1001 determines the platform user hasn't applied any authorization controls to the card that would cause payment processor 1001 to decline the request, payment processor 1001 sends the request to platform 1000 to determine whether the transaction is authorized. That is, payment processor 1001 sends the request to platform 1000 for it to approve or decline the request. In response to the request, platform 1000 applies one or more rules to determine if the transaction is authorized and, if so, sends an approval (901) of the transaction to payment processor 1001, which it forwards onto acquirer 1011 via network 1012. On the other hand, if in response to the request, platform 1000 determine that the transaction is not authorized for some reason (e.g., insufficient funds, fraudulent, against policy, etc.), then platform 1000 sends an indication that the transaction is declined to payment processor 1001. In this way, platform 1000 makes the authorization determination.

Issuing Overview

In one embodiment, businesses want to issue and manage their own payment cards. In such cases, a platform can quickly create, control, and distribute physical and virtual cards. When a new card is issued, a payment processor generates the required information and creates a new card for the cardholder.

Figure 19:
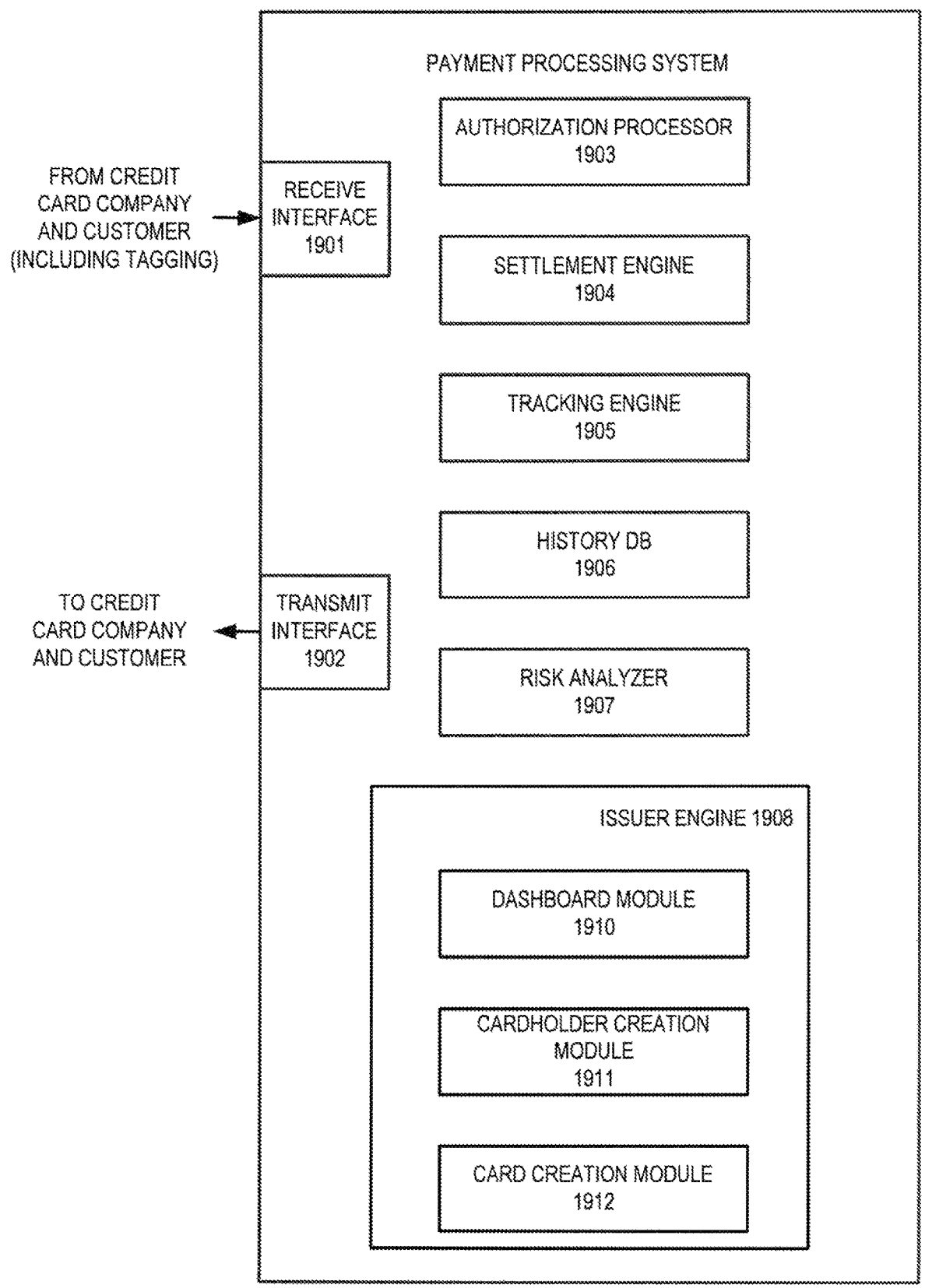
FIG. 19 is a block diagram of another embodiment of a payment processing system.

In one embodiment, cards and their issuance are managed using an API and a dashboard that is generated and operated using a dashboard module (e.g., 1900 of FIG. 19). Through the dashboard, businesses can set authorization controls on a per-card basis to restrict spending (e.g., maximum purchase amount) and dispute purchases. In one embodiment, using the API, customer specific spending rules can be created and customer specific spending rules and authorizations can be approved directly, and custom reports and statements can be generated.

Purchase Lifecycle Using an Issued Card

When an issued card is used to make a purchase, an authorization request is created. If approved, the authorized amount is held in reserve from the user's account balance. Some businesses can also update an authorization to request an additional amount (e.g., extending a hotel booking or adding a tip).

The business then captures (clears) the authorization, at which point a transaction is created and the held funds are deducted from the user's account. In one embodiment, if the business does not capture the authorization within seven days, it is reversed and the funds released.

If you have reason to question a purchase made with an issued card (e.g., a user suspects it to be fraudulent or an item received was counterfeit), the user can dispute it. The purchase amount is reversed and held while the dispute process takes place. If the dispute is upheld, the amount is credited back to the user's account balance.

Issuing Cards

In one embodiment, the following describes cardholders and one embodiment of a process for issuing credit cards to them.

In one embodiment, issuing a new card using the payment processor is a two-step process:

1. Create a cardholder with some information about them; and
2. Create a card for the cardholder.

In one embodiment, issued cards are activated before they can be used to make purchases.

Step 1: Create a Cardholder

In one embodiment, a cardholder represents an individual or business entity that can be issued cards. In one embodiment, a Cardholder with a name, billing address, entity type, and any additional information is created as shown in FIG. 10.

In one embodiment, in response to the above curl, a card holder creation module (e.g., 1901 of FIG. 19) of the system of the payment processor returns a Cardholder object that contains the information that was provided by a user, and sends an issuing_card.created webhook event to the user. An example of the Cardholder object is shown in FIG. 11.

Step 2: Create a Card

After creating a cardholder, a card that is assigned to them is created. In one embodiment, this is performed by generating a request to a card creation module (1902 of FIG. 19) of the payment processor. In one embodiment, this request contains the ID of the Cardholder object, currency, and card type (either physical or virtual). In one embodiment, if creating a physical card, a shipping address is required.

In one embodiment, the payment processor returns an Issuing Card object upon creation and sends an issuing_card.created event to the user. An example of the Issuing Card object is shown in FIG. 12.

In one embodiment, the payment processor handles the printing and shipping of physical cards on a daily basis. If multiple cards are created using the same shipping address, they are combined into a single shipment.

Thereafter, the issued cards are activated before they can be used. In one embodiment, this is performed by changing its status to active. In one embodiment, the status of each card is maintained in a record in a database of the payment processor along with its associated card information. Only active cards can be used to make a purchase. Any authorization requests using a card with a status of cancelled or inactive are automatically declined.

Transactions

In one embodiment, any card event that results in funds entering or leaving a payment processor account, such as a completed purchase, refund, or ATM withdrawal, is represented by a Transaction object. In one embodiment, transactions contain information about the card used, the cardholder, and the business to which it relates.

In one embodiment, when an authorization of a transaction is captured, the following actions take place simultaneously:

1) The authorization's status transitions to closed, releasing the previously held funds. A balance transaction is created to represent this.
2) A new Transaction object of type capture is created that deducts the purchase amount from the account balance. Another balance transaction is also created.

In one embodiment, the payment processor also notifies the payment processor user or the platform of these changes using the issuing.authorization.updated and issuing.transactions.created webhook events. In one embodiment, most transactions contain the identifier (ID) of the original authorization as a value for authorization. In some cases, such as, for example, refunds, in one embodiment, there isn't always an authorization to which a transaction can link. In one embodiment, should this occur, the value of authorization is set to null. An example is shown in FIG. 13.

Transaction Reporting

In one embodiment, card transaction information can be viewed in a dashboard and using the API. In one embodiment, the dashboard view lists all of the transactions across all issued cards, providing details such as, for example, amount, card used, date, description, name on card, and business and merchant category.

In one embodiment, the transactions shown are filtered by specifying the ID of an issued card.

In one embodiment, transactional data can be retrieved using the API, allowing specialized reports to be generated. For example, transactions can be retrieved to generate a typical credit card statement by listing transactions within a date range (e.g., 30 days) for a particular card. An example is shown in FIG. 14.

In one embodiment, pending purchases are included in the statements by listing authorizations that have a status of pending. These represent authorizations that are holding funds but have not yet been captured and for which no transaction has been created. An example of an authorization with a pending status is shown in FIG. 15.

Authorizations

In one embodiment, authorization requests made during a card purchase are handled by the platform. In an alternative embodiment, authorization requests are handled by the payment processor. When an active card is used to make a purchase, an authorization request is made and sent to the platform (or payment processor). In one embodiment, the request is sent as a network (e.g., Internet) communication. In one embodiment, this request must be approved for the purchase to be successfully completed. If it's not, the purchase is declined.

In response to receiving the authorization request, the payment processor first checks if the user has applied any authorization controls to the card that should decline the request. In one embodiment, to perform this check, the payment processor generates an access request for a database to obtain information related to the card and its authorization controls, if any. If the purchase is allowed, a check is made to determine if the user has configured an authorization endpoint (e.g., a platform) to handle authorization requests. If so, the payment processor sends an event to the platform integration for it to approve or decline the request. In one embodiment, this event is set as a network (e.g., Internet) communication. If no authorization controls specified that such a request should be declined and no endpoint is configured, the payment processor approves the authorization. The entire process takes only a few seconds to complete, and occurs while the cardholder and business wait for the response. In one embodiment, these operations of an authorization processor (e.g., 1901 of FIG. 19).

Once an authorization request is approved, an Authorization object is created in a pending state, and an issuing.authorization_updated webhook event is sent. The authorized amount is deducted from the user's account balance and held reserve until the authorization is either captured or voided. If it's captured, the Authorization object's status transitions to closed, and a new transaction is created. If voided, its status transitions to reversed.

Setting Authorization Controls

In one embodiment, authorization_controls can be set on individual cards that act as spending rules, giving more control over how cards can be used. For example, in one embodiment, the types of businesses with which a card can be used (e.g., bakeries, florists, etc.) can be blocked or allowed or a maximum amount per purchase (e.g., $100) can be set.

| Field | Type | Description |
| --- | --- | --- |
| allowed_categories | array | Array of strings containing categories of authorizations permitted on this card. |
| blocked_categories | array | Array of strings containing categories of authorizations to always decline on this card. |
| max_amount | integer | Maximum amount allowed per authorization on this card, in the currency of the card. Authorization amounts in a different currency will be converted to the card's currency when evaluating this control. |
| max_approvals | integer | Maximum count of approved authorizations on this card. Counts all authorizations retroactively. |

Authorization controls can be set when a card is created using a card creation module (1902). Existing cards can be updated to set or change authorization controls, or remove them completely. An example of an implementation of an authorization control is shown in FIG. 16.

Using the Platform (Integration) to Handle Authorization Requests

In one embodiment, the platform (e.g., an authorization endpoint) is specified in the Issuing settings to receive real-time notifications of authorization requests. Such requests would be received by the platform as network communications. Once configured, the payment processor sends events any time an authorization request is received. This event contains an Authorization object with information about the authorization request, such as, for example, the amount, card used, and business information (merchant_data). An example is shown in FIG. 17.

The platform then approves or declines the request with the Authorization object's ID. An example of an approval is shown in FIG. 18.

Updates to Authorizations

Businesses of certain categories have the ability to request additional funds from an existing authorization. For instance, a hotel needing to extend the length of a reservation can increase the amount of the original authorization, instead of charging the card to create another authorization request.

Should this occur, another issuing_authorization.request event is sent with the same Authorization object. This contains values for the pending_authorized_amount and pending_held_amount that represent the additional amount requested. For example, an authorization request that was originally approved for $100 might be updated for an additional $200. This updated request uses the same Authorization object as before. If the updated request is approved, the total amount authorized increases to $300.

| STAGE | PENDING AUTHORIZED AMOUNT | AUTHORIZED AMOUNT |
|---|---|---|
| Original authorization request | $100 | 0 |
| After original request was approved | 0 | $100 |
| Updated authorization request | $200 | $100 |
| After updated request was approved | 0 | $300 |

This process only occurs if a business requests more funds for a purchase. If a business reduces the amount of funds requested for an authorization, the authorized_amount is automatically reduced on the original authorization and the issuing_authorization.updated event is sent to notify the user.

FIG. 19 is a block diagram of another embodiment of a payment processing system. The payment processing system comprises hardware (circuitry, dedicated logic, etc.), software (e.g., software running on a chip), firmware, or a combination of the three. While the payment processing system is shown as one system, in one embodiment, the payment processing system is implemented with more than one system (e.g., a plurality of processing devices, servers, computer systems, etc.).

Referring to FIG. 19, the payment processing system comprises a receive interface 1901 and a transmit interface 1902. Note that these may be the same interface. Receive interface 1901 and transmit interface 1902 communication transaction information, including payment authorization requests and responses between the customers, merchants, service providers and paying networks.

In one embodiment, the payment processing system includes an authorization processor 1903 for authorizing transactions and funding transfers, and performs other authorizations functions are described herein.

In one embodiment, the payment processing system includes settlement engine 1904 for settling transactions including netted out transactions amounts between payment flows as described herein.

In one embodiment, the payment processing system includes tracking engine 1905 for tracking transactions, including those with multiple payment flows, to enable settlement to be performed by netting transaction amounts of multiple payment flows. In one embodiment, tracking engine 1905 exchanges information with settlement engine 1904 to enable settlement engine 1904 to perform the netting of transaction amounts. That is, tracking engine 1905 determines when transactions associated with different payment flows are related to each other so that settlement engine 1904 is able to adjust a customer's balance based on a netted amount between the related payment flows.

In one embodiment, the payment processing system includes history database 1906 to store transaction history. Such transaction history may include all of the customer's transactions because the payment processor is the card issuer. The transaction history is provided to the payment processor's customers for use in analyzing their transaction information. In one embodiment, transaction history is provided to tracking engine 1905 to facilitate the determination that transactions of different payment flows are related to each other.

In one embodiment, the payment processing system includes risk analyzer 1907 to make fraud determinations based on the transaction information, such as, for example, as described above. In one embodiment, risk analyzer 1907 uses transaction information from history database 1906 along with information of pending transactions awaiting approval to detect fraud with respect to the pending transactions. In one embodiment, risk analyzer 1907 generates a fraud score or other fraud indication for each transaction it analyzes.

In one embodiment, the payment processing system includes issuer engine 1908. In one embodiment, issuer engine 1908 comprises a dashboard module 1910 for generating and presenting a user interface, a cardholder creation module 1911 for creating cardholders, and a card creation module 1912 for creating cards for cardholders.

Note that the payment processing system includes other functional units and performs other well-known operations associated with payment processing.

There is a number of example embodiments described herein.

Example 1 is a method comprising: electronically receiving, at a payment processing system, approval from an intermediary platform associated with a payment processor user of a first authorization request for a first transaction from a server-side application running at a remote location of a service provider, the first authorization request including a first transaction amount, first tracking information and first payment information specifying a first payment amount; electronically receiving for approval, at the payment processing system, a second authorization request for a second transaction from a merchant using a payment instrument issued to the service provider by the payment processing system and used by an agent of the service provider, the transaction request including a second transaction amount, the second tracking information and a payment information specifying a payment amount; settling transactions associated with the service provider, using a settlement engine of the payment processing system, including clearing a batch of records corresponding to the service provider on a predetermined time basis by comparing, with a tracking engine of the payment processing system, transaction tracking information associated with authorization requests to net out individual transactions, including determining the first and second request authorization requests are related to a single transaction using the tracking information, and adjusting, by the payment processing system, an available balance of the service provider by a netted amount between the first and second transaction amounts.

Example 2 is the method of example 1 that may optionally include electronically sending, by the payment processing system, approval information or declining information after determining whether to approve or decline the first authorization request, respectively; and electronically sending, by the payment processing system, approval information or declining information after determining whether to approve or decline the second authorization request, respectively.

Example 3 is the method of example 1 that may optionally include sending payment information corresponding to the second transaction amount upon authorization approval; deducting the second transaction amount from the available balance of the service provider into a held state; releasing the second transaction amount from the held state; and deducting a clearing amount equal to the netted amount from the available balance.

Example 4 is the method of example 1 that may optionally include generating a fraud likelihood score based on comparing transaction information of the one transaction with similar past transactions of the service provider stored in a memory accessible to the payment processing system and determining if parameters of the one transaction are comparable with the similar past transactions.

Example 5 is the method of example 1 that may optionally include approving or declining an authorization via a POST hook electronically sent from the payment processing system and the service provider.

Example 6 is the method of example 1 that may optionally include that the batches of records comprise captures and refunds.

Example 7 is the method of example 1 that may optionally include that the payment processing system electronically sends information authorizing the second payment to the merchant prior to receiving payment for settlement of the second payment from the service provider.

Example 8 is one or more non-transitory computer readable storage media having instructions stored thereupon for evaluating performance of a rule defined by a user for fraud prevention in which the instructions, when executed by a system having at least a processor and a memory therein, the instructions cause the system to perform operations comprising: electronically receiving, at a payment processing system, approval from an intermediary platform associated with a payment processor user of a first authorization request for a first transaction from a server-side application running at a remote location of a service provider, the first authorization request including a first transaction amount, first tracking information and first payment information specifying a first payment amount; electronically receiving for approval, at the payment processing system, a second authorization request for a second transaction from a merchant using a payment instrument issued to the service provider by the payment processing system and used by an agent of the service provider, the transaction request including a second transaction amount, the second tracking information and a payment information specifying a payment amount; and settling transactions associated with the service provider, using a settlement engine of the payment processing system, including clearing a batch of records corresponding to the service provider on a predetermined time basis by comparing, with a tracking engine of the payment processing system, transaction tracking information associated with authorization requests to net out individual transactions, including determining the first and second request authorization requests are related to a single transaction using the tracking information, and adjusting, by the payment processing system, an available balance of the service provider by a netted amount between the first and second transaction amounts.

Example 9 is the non-transitory computer readable storage media of example 8 that may optionally include that the method further comprises electronically sending, by the payment processing system, approval information or declining information after determining whether to approve or decline the first authorization request, respectively; and electronically sending, by the payment processing system, approval information or declining information after determining whether to approve or decline the second authorization request, respectively.

Example 10 is the non-transitory computer readable storage media of example 9 that may optionally include that the method further comprises sending payment information corresponding to the second transaction amount upon authorization approval; deducting the second transaction amount from the available balance of the service provider into a held state; releasing the second transaction amount from the held state; and deducting a clearing amount equal to the netted amount from the available balance.

Example 11 is the non-transitory computer readable storage media of example 8 that may optionally include that the method further comprises generating a fraud likelihood score based on comparing transaction information of the one transaction with similar past transactions of the service provider stored in a memory accessible to the payment processing system and determining if parameters of the one transaction are comparable with the similar past transactions.

Example 12 is the non-transitory computer readable storage media of example 8 that may optionally include that the method further comprises approving or declining an authorization via a POST hook electronically sent from the payment processing system and the service provider.

Example 13 is the non-transitory computer readable storage media of example 8 that may optionally include that the batches of records comprise captures and refunds.

Example 14 is the non-transitory computer readable storage media of example 8 that may optionally include that the payment processing system electronically sends information authorizing the second payment to the merchant prior to receiving payment for settlement of the second payment from the service provider.

Example 15 is a payment processing system to process transactions, where the payment processing system comprises: memory to store instructions; a processor to execute the stored instructions; a receive interface to electronically receive for approval a first authorization request for a first transaction from a server-side application running at a remote location of a service provider, the first authorization request including a first transaction amount, first tracking information and first payment information specifying a first payment amount and being approved by an intermediary platform associated with a payment processor user of a payment processor, and a second authorization request for a second transaction from a merchant using a payment instrument issued to the service provider by the payment processing system and used by an agent of the service provider, the transaction request including a second transaction amount, the second tracking information and a payment information specifying a payment amount; and a settlement engine including hardware for settling transactions associated with the service provider when clearing a batch of records corresponding to the service provider on a predetermined time basis by comparing, with a tracking engine of the payment processing system, transaction tracking information associated with authorization requests to net out individual transactions, including determining the first and second request authorization requests are related to a single transaction using the tracking information, and adjusting, by the payment processing system, an available balance of the service provider by a netted amount between the first and second transaction amounts.

Example 16 is the payment processing system of example 15 that may optionally include a transmit interface to electronically transmit: approval information or declining information after determining whether to approve or decline the first authorization request, respectively; and approval information or declining information after determining whether to approve or decline the second authorization request, respectively.

Example 17 is the payment processing system of example 16 that may optionally include that the transmit interface is operable to send payment information corresponding to the second transaction amount upon authorization approval, and further wherein the settlement engine is operable to: deduct the second transaction amount from the available balance of the service provider into a held state, release the second transaction amount from the held state, and deduct a clearing amount equal to the netted amount from the available balance.

Example 18 is the payment processing system of example 15 that may optionally include a risk analyzer to generate a fraud likelihood score based on comparing transaction information of the one transaction with similar past transactions of the service provider stored in a memory accessible to the payment processing system and determining if parameters of the one transaction are comparable with the similar past transactions.

Example 19 is the payment processing system of example 15 that may optionally include that the transmit interface sends a POST hook to obtain authorization.

Example 20 is the payment processing system of example 15 that may optionally include that the transmit interface electronically sends information authorizing the second payment to the merchant prior to receiving payment for settlement of the second payment from the service provider.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:
1. A method comprising:
electronically receiving, at a payment processing system, approval, from of a first authorization request for a first transaction from a server-side application running at a remote location of a platform, the platform being a user of the payment processing system, the first authorization request including a first tracking information and first payment information specifying a first payment amount that is part of a first payment flow for the first transaction;

electronically receiving for approval, at the payment processing system, a second authorization request for a second transaction from a merchant using a payment instrument associated with the platform responsive to the first transaction being initiated at a first time that corresponds to a time period when the payment processing system electronically receives approval from the platform of the first authorization request for the first transaction, the second authorization request including second tracking information and second payment information specifying a payment amount that is part of a second payment flow for the second transaction, the first and second payment flows progressing independently of each other;

settling transactions associated with the platform, using a settlement engine of the payment processing system, in which funds are transferred to the payment processing system from a paying network as part of the first payment flow at a second time, after the first time, that corresponds to a time period when funds are transferred by the payment processing system as part of the second payment flow, wherein the settling includes comparing, with a tracking engine of the payment processing system, the first and second tracking information associated with the first and second authorization requests and determining the first and second authorization requests are related to each other in that the second transaction corresponds to a service performed by an agent of the platform; and adjusting, by the payment processing system, an available balance of the platform by an amount based on transaction amounts of the first and second transactions.

2. The method of claim 1 further comprising determining whether the first transaction or the second transaction is fraudulent using information collected as part of the second payment flow or the first payment flow, respectively.

3. The method of claim 1 further comprising generating a fraud likelihood score based on comparing transaction information of the first or second transactions with similar past transactions of the platform and determining if parameters of the first or second transactions, respectively, are comparable with the similar past transactions as part of determining a likelihood of fraud in the first or second transactions, respectively.

4. The method of claim 1 further comprising:
determining, by the payment processing system, to approve or decline the first and second authorization requests; and
electronically sending, by the payment processing system, approval information or declining information based on whether approving or declining, respectively, for each of the first and second authorization requests, respectively.

5. The method of claim 4 further comprising:
sending payment information corresponding to a second transaction amount of the second transaction upon authorization approval;
deducting the second transaction amount from the available balance of the platform into a held state;
releasing the second transaction amount from the held state; and
deducting a clearing amount equal to a netted amount from the available balance.

6. The method of claim 1 further comprising approving or declining an authorization, via a hook in the form of a POST request, electronically sent from the payment processing system and the platform.

7. The method of claim 1 wherein settling transactions associated with the platform comprises settling batches of records that include captures and refunds.

8. The method of claim 1 wherein the payment processing system electronically sends information authorizing the second payment to the merchant prior to receiving payment for settlement of the second payment from the platform.

9. One or more non-transitory computer readable storage media having instructions stored thereupon for evaluating performance of a rule defined by a user for fraud prevention in which the instructions, when executed by a system having at least a processor and a memory therein, the instructions cause the system to perform operations comprising:
electronically receiving, at a payment processing system, approval, from of a first authorization request for a first transaction from a server-side application running at a remote location of a platform, the platform being a user of the payment processing system, the first authorization request including a first tracking information and first payment information specifying a first payment amount that is part of a first payment flow for the first transaction;

electronically receiving for approval, at the payment processing system, a second authorization request for a second transaction from a merchant using a payment instrument associated with the platform responsive to the first transaction being initiated at a first time that corresponds to a time period when the payment processing system electronically receives approval from the platform of the first authorization request for the first transaction, the second authorization request including second tracking information and second payment information specifying a payment amount that is part of a second payment flow for the second transaction, the first and second payment flows progressing independently of each other;

settling transactions associated with the platform, using a settlement engine of the payment processing system, in which funds are transferred to the payment processing system from a paying network as part of the first payment flow at a second time, after the first time, that corresponds to a time period when funds are transferred by the payment processing system as part of the second payment flow, wherein the settling includes comparing, with a tracking engine of the payment processing system, the first and second tracking information associated with the first and second authorization requests and determining the first and second authorization requests are related to each other in that the second transaction corresponds to a service performed by an agent of the platform; and adjusting, by the payment processing system, an available balance of the platform by an amount based on transaction amounts of the first and second transactions.

10. The non-transitory computer readable storage media defined in claim 9 wherein the method further comprises determining whether the first transaction or the second transaction is fraudulent using information collected as part of the second payment flow or the first payment flow, respectively.

11. The non-transitory computer readable storage media defined in claim 9 wherein the method further comprises:
generating a fraud likelihood score based on comparing transaction information of the first or second transactions with similar past transactions of the platform; and
determining if parameters of the first or second transactions, respectively, are comparable with the similar past transactions as part of determining a likelihood of fraud in the first or second transactions, respectively.

12. The non-transitory computer readable storage media defined in claim 9 wherein the method further comprises:
   determining, by the payment processing system, to approve or decline the first and second authorization requests; and
   electronically sending, by the payment processing system, approval information or declining information based on whether approving or declining, respectively, for each of the first and second authorization requests, respectively.

13. The non-transitory computer readable storage media defined in claim 12 wherein the method further comprises:
   sending payment information corresponding to a second transaction amount of the second transaction upon authorization approval;
   deducting the second transaction amount from the available balance of the platform into a held state;
   releasing the second transaction amount from the held state; and
   deducting a clearing amount equal to a netted amount from the available balance.

14. The non-transitory computer readable storage media defined in claim 9 wherein the method further comprises approving or declining an authorization, via a hook in the form of a POST request, electronically sent from the payment processing system and the platform.

15. The non-transitory computer readable storage media defined in claim 9 wherein settling transactions associated with the platform comprises settling batches of records that include captures and refunds.

16. The non-transitory computer readable storage media defined in claim 9 wherein the payment processing system electronically sends information authorizing the second payment to the merchant prior to receiving payment for settlement of the second payment from the platform.

17. A payment processing system to process transactions, the payment processing system comprising:
   a memory to store instructions;
   one or more processors to execute the stored instructions;
   a receive interface to electronically receive, for approval,
      a first authorization request for a first transaction from a server-side application running at a remote location of a platform, the platform being a user of the payment processing system, the first authorization request including a first tracking information and first payment information specifying a first payment amount that is part of a first payment flow for the first transaction, and
      a second authorization request for a second transaction from a merchant using a payment instrument associated with the platform responsive to the first transaction being initiated at a first time that corresponds to a time period when the payment processing system electronically receives approval from the platform of the first authorization request for the first transaction, the second authorization request including second tracking information and second payment information specifying a payment amount that is part of a second payment flow for the second transaction, the first and second payment flows progressing independently of each other; and
   a settlement engine including hardware for settling transactions associated with the platform in which funds are transferred to the payment processing system from a paying network as part of the first payment flow at a second time, after the first time, that corresponds to a time period when funds are transferred by the payment processing system as part of the second payment flow, wherein the settlement engine settles transactions by, in part, comparing, with a tracking engine of the payment processing system, the first and second tracking information associated with the first and second authorization requests and determining the first and second authorization requests are related to each other in that the second transaction corresponds to a service performed by an agent of the platform.

18. The payment processing system defined in claim 17 wherein the one or more processors are operable to determine whether the first transaction or the second transaction is fraudulent using information collected as part of the second payment flow or the first payment flow, respectively.

19. The payment processing system defined in claim 17 wherein the one or more processors are operable to generate a fraud likelihood score based on comparing transaction information of the first or second transactions with similar past transactions of the platform and determining if parameters of the first or second transactions, respectively, are comparable with the similar past transactions as part of determining a likelihood of fraud in the first or second transactions, respectively.

20. The payment processing system defined in claim 17 wherein the one or more processors are operable to:
   approve or decline the first and second authorization requests; and
   electronically send approval information or declining information based on whether approving or declining, respectively, for each of the first and second authorization requests, respectively;
   send payment information corresponding to a second transaction amount of the second transaction upon authorization approval;
   deduct the second transaction amount from the available balance of the platform into a held state;
   release the second transaction amount from the held state; and
   deduct a clearing amount equal to a netted amount from the available balance.

* * * * *